United States Patent [19]

Calfee et al.

[11] Patent Number: 5,982,571
[45] Date of Patent: Nov. 9, 1999

[54] DISK DRIVE WITH CLOSED LOOP COMMUTATOR AND ACTUATOR OSCILLATOR

[75] Inventors: Gary W. Calfee, Santa Clara; David B. Jeppson, Livermore, both of Calif.

[73] Assignee: Quantum Corporation, Milpitas, Calif.

[21] Appl. No.: 08/912,965

[22] Filed: Jun. 30, 1997

[51] Int. Cl.$^6$ .......................... G11B 19/20; G11B 21/02
[52] U.S. Cl. .......................... 360/70; 360/73.03; 360/75
[58] Field of Search .................... 360/69, 70, 71, 360/75, 73.01, 73.03, 97.01, 98.07, 99.04, 99.08; 310/68 R; 318/254, 138, 431, 437, 439

[56] References Cited

U.S. PATENT DOCUMENTS

| | | | |
|---|---|---|---|
| 4,530,021 | 7/1985 | Cameron | 360/97.01 |
| 4,589,036 | 5/1986 | Bertschy et al. | 360/75 |
| 4,897,743 | 1/1990 | Kohno | 360/75 |
| 4,970,610 | 11/1990 | Knappe | 360/75 |
| 5,018,029 | 5/1991 | Ekhoff et al. | 360/69 |
| 5,117,315 | 5/1992 | Nagasaki et al. | 360/75 |
| 5,191,270 | 3/1993 | McCormack | 318/254 |
| 5,254,914 | 10/1993 | Dunfield et al. | 318/254 |
| 5,397,971 | 3/1995 | McAllister et al. | 360/75 |
| 5,530,602 | 6/1996 | Boutaghou et al. | 360/75 |
| 5,717,298 | 2/1998 | Tang et al. | 318/254 |
| 5,801,505 | 9/1998 | Lee et al. | 360/75 |

FOREIGN PATENT DOCUMENTS

| | | | |
|---|---|---|---|
| 59-177762 | 10/1984 | Japan | 360/75 |
| 60-147979 | 8/1985 | Japan | 360/75 |
| 62-295262 | 12/1987 | Japan | 360/75 |
| 63-291279 | 11/1988 | Japan | 360/75 |
| 2-81379 | 3/1990 | Japan | 360/75 |
| 2-244459 | 9/1990 | Japan | 360/75 |

OTHER PUBLICATIONS

IBM Technical Disclosure Bulletin, "Hard Disk Drive Spindle Motor Excitation Function", vol. 32, No. 3B, pp. 40–41, Aug. 1989.

IBM Technical Disclosure Bulletin, "Magnetic Recording File with Data Recovery Capability and a High Start Torque Spindle Driver", vol. 31, No. 12, pp. 40–41, May 1989.

*Primary Examiner*—David L. Ometz
*Attorney, Agent, or Firm*—Michael Zarrabian

[57] ABSTRACT

A disk drive having: (a) at least one data disk; (b) a brushless DC motor coupled to the data disk, the motor having: (i) multiple phase windings arranged as a stator, and (ii) a rotor having a permanent magnet or a DC current excitation winding for rotating the data disk; (c) a transducer for writing data to or reading data from the data disk; (d) a carrier supporting the transducer; (e) a voice coil motor coupled to the carrier for moving the carrier radially across the disk; (f) a drive controller coupled to the brushless DC motor and to the voice coil motor; and (g) a support for supporting the brushless DC motor, the voice coil motor and the drive controller. The drive controller periodically samples the rotor position and then drives the motor by energizing appropriate phase windings in relation to the rotor position that provide maximum forward torque to the rotor. While driving the motor, the drive controller also applies a series of current pulses to the VCM to oscillate the head carrier radially in and out. The combined application of maximum torque to the rotor and oscillation of the head carrier overcomes stiction between the slider and the surface of the disk to rotate the disk.

61 Claims, 15 Drawing Sheets

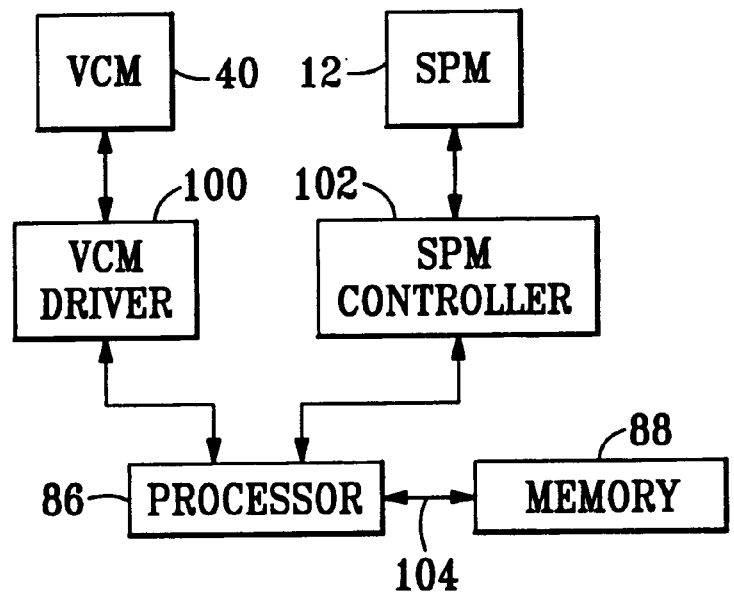
FIG. 6
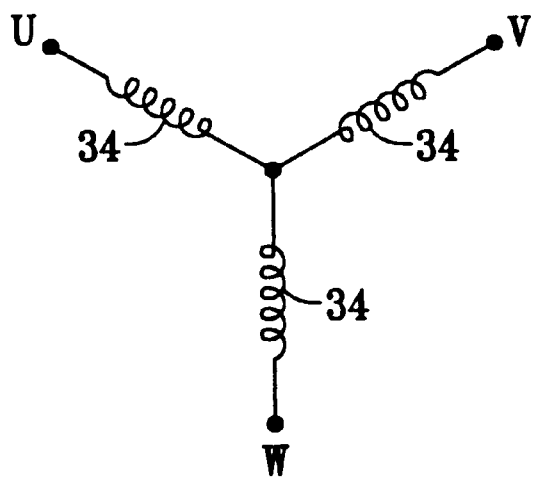 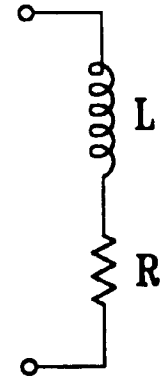
FIG. 7  FIG. 8

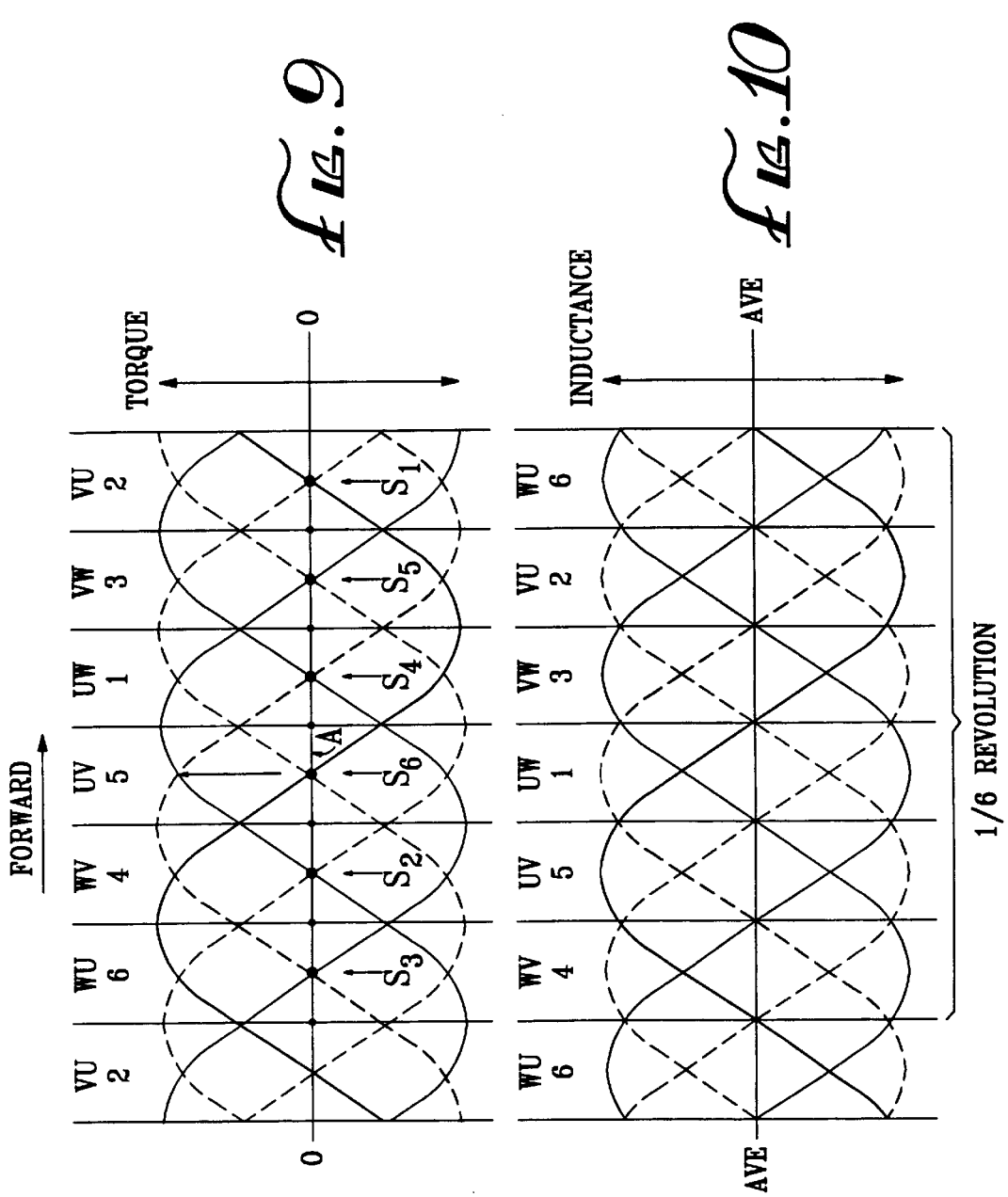

DISK DRIVE WITH CLOSED LOOP COMMUTATOR AND ACTUATOR OSCILLATOR

FIELD OF THE INVENTION

The present invention relates generally to data recording disk drives. More particularly, the invention relates to disk drives having carrier supported read/write heads, means for commutating the disk drives and means for releasing the carriers from the disks when the carriers are stuck to disk surfaces, or when there exists a large friction coefficient at the carrier to disk interface.

BACKGROUND OF THE INVENTION

Disk drives are utilized in many information and processing systems for storing data. A typical disk drive includes a spindle motor for rotating a data disk, and an actuator for moving a head carrier that supports read/write heads radially across the disk to access data stored on concentric data tracks on the disk. Many disk drives include a plurality of disks separated by spacer rings and stacked on a hub attached to the spindle motor, a plurality of read/write heads, and a plurality of of head carriers, each head carrier supporting at least one head. A head carrier typically includes an air-bearing slider that rides on a bearing of air above a disk surface when the disk is rotating at its operational speed.

A data disk surface is typically very smooth in order to increase storage capacity of the disk and to maintain consistent magnetic properties across the disk. However, a smooth disk surface causes stiction when a head carrier slider comes into stationary contact with the disk surface. Stiction causes the slider to stick to the disk surface, resisting rotation of the disk.

Stiction can be caused by static friction, and adhesion forces between the disk surface and the slider created by the lubricant on the disk surface. Stiction has a step function characteristic with a maximum value when the disk and the slider are in stationary contact and a minimum value when the disk and the slider are moving relative to one another. Therefore, when disk rotation is initiated, stiction between the slider and the disk instantly drops from the maximum value to the minimum value, causing the slider to suddenly break free of the disk. Further, in many low power disk drives such as used in laptop computers, despite application of full power to the spindle motor, the spindle motor cannot overcome stiction between the slider and the disk. In that case, the disk drive is not operational and none of the data on the disk can be accessed.

To prevent the slider from sticking to the disk, some disk drives, such as contact start/stop disk drives, provide a parking zone for the slider, away from the smooth surface of the disk. In contact start/stop disk drives, the slider is in contact with the disk surface during start and stop operations when there is insufficient disk rotational speed to maintain an air bearing between the slider and the disk surface. The disk includes a landing zone in a specially textured non-data region of the disk where the slider is parked during stop and start operations. In other disk drives, the slider is mechanically unloaded from the disk when the disk is not operating, and then loaded back on when the disk has achieved sufficient rotational speed to provide an air bearing for the slider. To unload the slider, a ramp is included in the disk drive housing to contact the head carrier when the head carrier is rotated to the outer periphery of the disk. The ramp lifts and suspends the slider off the surface of the disk.

However, the slider can come into stationary contact with, and stick to, the disk when, for example, the slider is displaced from the landing zone or the ramp due to external shock or actuator failure. If the spindle motor cannot overcome stiction between the slider and the surface of the disk to rotate the disk, none of the data stored on the disk can be accessed. The disk must be physically removed from the disk drive and the date stored thereon accessed by other means.

To start the disk rotating, some disk drive manufacturers have incorporated a dithering function into the actuator controller. The actuator controller applies a train of short duration pulses to the actuator and dithers the head carrier radially to gradually break it free of the disk. Specifically, at startup, a normal startup routine attempts to rotate of the disk. If the normal startup routine fails to rotate the disk, an emergency startup routine is initiated where power is applied to the spindle motor and the head carrier is dithered for a period of time to break it free of the disk. If at the end of the dithering period the disk is rotating, the emergency routine ends. Otherwise, the procedure is repeated until the disk begins rotating or a timeout occurs.

A problem with such disk drives, however, is in the way power is applied to the spindle motor to start the motor and accelerate it to its operational speed. A typical disk drive spindle motor is a brushless DC motor having multiple phase windings arranged as a stator, and a rotor having a permanent magnet for rotating the disk. During an acceleration phase, the motor is commutated to start from standstill and accelerated to its operational speed. Thereafter, the motor is commutated to maintain that operational speed, by sequentially energizing appropriate phase windings based on the location of the rotor to the phase windings. The energized windings generate torque inducing magnetic fields relative to the rotor magnet that rotate the rotor.

However, in such disk drives, the position of the rotor relative to the phase windings at startup is not known. Frequently, inappropriate phase windings relative to the rotor are energized, generating magnetic fields that induce little or no torque to rotate the rotor. As a result, despite application of full power to the spindle motor and dithering of the head carrier, the motor cannot overcome stiction between the slider and the surface of the disk. Further, energizing inappropriate phase windings relative to the rotor can generate magnetic fields that turn the rotor and the disk in the wrong direction, damaging the slider and the read/write heads.

In order to ensure that proper phase windings are energized, sensing devices, such as Hall sensors, can be used to determine the rotor position relative to the windings at startup. Once the rotor position is determined, appropriate windings can be energized to provide maximum torque to the rotor. The rotor position can also be used to energize appropriate windings to rotate the rotor in the correct direction every time. However, such sensors must be precisely positioned and the sensor components are expensive and take up physical space in the motor. Further, environmental variations such as temperature fluctuations severely affect their accuracy.

Some disk drives include indirect position detection systems, such as back electromotive force (emf) detectors, that do not require sensors. Back emf detectors sense back emf transitions in the phase windings, due to magnetic flux caused by a moving rotor, to identify the proper phase windings to be energized. However, such detection systems do not provide rotor position information when the rotor is stationary relative to the windings or when the rotor is not rotating at or above a certain speed. For example, when the rotor is not rotating due to stiction between the disk and the slider, there are no back emf transitions in the stator windings to hint at the rotor position.

In order to detect rotor position at startup, some disk drives include a detector for injecting short current pulses in different phase windings. The times required for the currents in each phase to reach a predetermined level are measured and subtracted from one another. The magnitude and sign of the results are then utilized to determine rotor position relative to the windings at startup. Thereafter, appropriate windings are energized by open loop commutation of the motor based on timing tables pre-stored in memory. The timing tables include information for energizing selected windings at the most beneficial times and for providing torque to the rotor in the correct direction.

However, a problem with such drives is that timing of the commutations is based on expected rotational positions of the rotor relative to the windings. In particular, after the rotor position is initially determined and the appropriate phase windings are energized to start rotation of the rotor in the correct direction, the timing of the commutations is based on the predetermined timing tables. Therefore, if the rotor does not rotate to the next commutation point in a predetermined time, as expected, the commutation timing will be off. Thereafter, the phase windings energized for commutating the rotor may not provide torque to the rotor at the most beneficial time. Improper commutation timing can impede rotation of the rotor, slow the rotor to a stop, and cause irregular rotor rotation speed. This is particularly problematic where stiction between the head carrier slider and the smooth surface of the disk, impedes rotation of the disk at startup. In that case, the time necessary for the rotor to rotate to the next commutation point is vastly different from that predicted by the timing tables.

A further disadvantage of open loop commutation is that a commutation timing table developed for a particular disk drive may be unusable for another disk drive with different physical characteristics. For example, the number of disks in a disk drive directly affect the frictional and inertial forces present in the disk drive. The friction forces in turn affect the rate of rotation of the rotor, requiring a different commutation timing. As such, disk drives with differing number of disks require differing commutation timing tables, increasing the cost and complexity of all disk drives. The commutation timing tables also take up precious memory space, such as ROM.

Other disk drives include rotor position detectors for applying short duration current pulses to each motor phase and monitoring the motor current responses to each pulse. Typically, the amplitude of one of the motor current responses is higher than the rest, and the motor phase producing the higher amplitude indicates rotor position. However, a problem with such drives is that the difference between the pulses returned from the different phases may be very small. As such, determining rotor position based on the differences is difficult and unreliable. Further, measurement accuracy is affected by temperature and differences between the phase inductances or phase resistances.

There is, therefore, a need for a disk drive capable of overcoming stiction between head carriers and one or more disks, and accelerating the disks from standstill in the correct direction, while reliably and consistently applying maximum forward torque to the disks.

BRIEF SUMMARY OF THE INVENTION

The present invention satisfies these needs.

In one embodiment, the present invention provides a disk drive comprising: (a) at least one data disk; (b) a brushless DC motor coupled to the data disk, the motor having: (i) multiple phase windings arranged as a stator, and (ii) a rotor having a permanent magnet or a DC current excitation winding for rotating the data disk; (c) a transducer for writing data to or reading data from the data disk; (d) a carrier supporting the transducer; (e) a voice coil motor coupled to the carrier for moving the carrier radially across the disk; (f) a drive controller coupled to the brushless DC motor and to the voice coil motor; and (g) a support for supporting the brushless DC motor, the voice coil motor and the drive controller. Generally, the drive controller periodically samples the rotor position and then drives the motor by energizing appropriate phase windings in relation to the rotor position that provide maximum forward torque to the rotor. While driving the motor, the drive controller also applies a series of current pulses to the VCM to oscillate the head carrier radially in and out. The combined application of maximum torque to the rotor based on rotor position and oscillation of the head carrier, overcomes stiction between the slider and the smooth surface of the disk to rotate the disk.

The drive controller comprises: (i) a detector for detecting a rotational position of the rotor relative to the windings during the time period $T_D$; (ii) a selector circuit for selectively establishing current paths through selected windings capable of providing maximum torque to the rotor based on the rotational position of the rotor relative to the windings; (iii) a driver for applying a drive current to the selected windings for the time period $T_T$ to provide maximum torque to rotate the rotor; and (iv) an oscillator for applying a series of alternative positive and negative current pulses to the voice coil motor to oscillate the carrier radially in and out during at least a portion of the time period $T_T$.

The drive controller can further comprise a synchronizer for: (i) signaling the driver to apply the drive current to the selected windings for the time period $T_T$, and (ii) signaling the oscillator to apply the series of current pulses to the voice coil motor during at least a portion of the time period $T_T$. The drive controller can also include a sequencer for: (i) triggering the detector to detect the rotor position during the time period $T_D$, (ii) triggering the selector circuit to establish said current paths after the time period $T_D$, and (iii) triggering the synchronizer to signal the driver and the oscillator. A sensor can be included in the drive controller for sensing the rotational speed of the rotor and for generating an alert signal if the rotor speed is less than an operational speed of the rotor, wherein the sequencer triggers the detector, the selector circuit and the synchronizer in response to the alert signal.

The drive controller can be implemented as a logic circuit electrically interconnected to the DC motor and to the voice coil motor, the logic circuit being configured by program instructions to perform the steps of: (1) determining a rotational position of the rotor relative to the windings during the time period $T_D$; (2) selectively establishing current paths through selected windings capable of providing maximum forward torque to the rotor based on the rotational position of the rotor; (3) applying a current to the selected windings for the time period $T_T$ to provide maximum forward torque to rotate the rotor; and (4) applying a series of alternative positive and negative current pulses to the voice coil motor to oscillate the carrier radially in and out during at least a portion of the time period $T_T$. The logic circuit can further include program instructions for monitoring the rotation speed of the rotor, and repeating program instruction steps (1)–(4) if the rotor speed is less than an operational speed of the rotor. The logic circuit can comprise one or more memory devices containing the program instructions, and one or more processors electrically interconnected to the DC motor, to the voice coil motor, and to the memory devices, for executing the program instructions.

In another embodiment, the drive controller can comprise: (a) a logic circuit electrically interconnected to the DC motor, the logic circuit being configured by program instructions for performing the steps (1)–(3) above; (b) a computer program including program instructions for performing the step (4) above; (c) a memory device containing the computer program; and (d) a processor electrically interconnected to the memory device, to the logic circuit and to the voice coil motor, for executing the program instructions of the computer program in synchrony with the operation of the logic circuit. The computer program can further include program instructions for monitoring the rotation speed of the rotor, and, if the rotor speed is less than an operational speed of the rotor, (i) signaling the logic circuit to repeat the steps (1)–(3), and (ii) performing the step (4).

In yet another embodiment, the drive controller can comprise: (a) a first logic circuit electrically interconnected to the DC motor, the first logic circuit being configured by program instructions to perform the steps (1)–(3) above; and (b) a second logic circuit electrically interconnected to the voice coil motor, the second logic circuit being configured by program instructions to perform the step (4) above. A programmed processor can be electrically interconnected to the first logic circuit and to the second logic circuit to synchronize the operations of the first and the second logic circuits. The first logic circuit can further include program instructions for monitoring the rotation speed of the rotor; and, if the rotor speed is less than an operational speed of the rotor: (i) repeating the steps (1)–(3), and (ii) signaling the second logic circuit to the perform step (4).

In another aspect, the present invention provides a method for accelerating the motor of the disk drive from standstill to a threshold speed by: (a) determining a rotational position of the rotor relative to the phase windings during a time period $T_D$; (b) selectively establishing current paths through selected windings capable of providing maximum torque to the rotor based on the rotational position of the rotor; (c) applying a current to the selected windings for a time period $T_T$ to provide maximum torque to rotate the rotor; and (d) applying a series of alternative positive and negative current pulses to the VCM to oscillate the carrier radially in and out during at least a portion of the time period $T_T$. Steps (a)–(d) can be repeated until the motor has accelerated to the threshold speed or a timeout occurs.

In another embodiment, the method of the present invention comprises the steps of: (a) determining a rotational position of the rotor relative to the windings during a time period $T_D$; (b) selectively establishing current paths through selected windings capable of providing maximum torque to the rotor based on the rotational position of the rotor; and (c) applying a current to the selected windings for a time period $T_T$ to provide maximum torque to rotate the rotor. If after a predetermined number of repetitions of steps (a)–(c) the motor has not accelerated to the threshold speed, a series of alternative positive and negative current pulses are applied to the VCM to oscillate the carrier radially in and out during at least a portion of the time period $T_T$ in step (c). This process can be repeated until the motor has accelerated to the threshold speed or a timeout occurs.

The present invention also discloses a software system comprising program instructions to perform the steps of the method of the present invention.

The disk drive of the present invention has many advantages over existing disk drives. In particular, the combined application of maximum torque to the rotor and oscillation of the head carrier during a $T_T$ time period overcomes stiction between the carrier slider and the smooth surface of the disk to rotate the disk. Further, even if energizing selected phase windings in a $T_T$ time period does not induce maximum forward torque to the rotor, the rotor is still provided with forward torque to rotate. This is important since, at standstill, the disk is provided with forward torque to break stiction, and, when the disk is moving, it is provided with enough inertia to coast through a $T_D$ period for rotor position detection and application of maximum forward torque in a subsequent $T_T$ period. Another advantage of the disk drive of the present invention is that by detecting the rotor position, the drive controller selects appropriates phase windings based on the actual, rather than expected, position of the rotor relative to the windings. As such, the drive controller commutates the motor efficiently and reliably without the use of commutation tables and inherent disadvantages therein.

BRIEF DESCRIPTION OF THE DRAWINGS

These and other features, aspects and advantages of the present invention will become better understood with regard to the following description, appended claims and accompanying drawings where:

FIG. 6 shows a block diagram of an example implementation of the drive controller of FIG. 3;

FIG. 7 shows a simplified circuit diagram of the phase windings of a 3 phase motor for the disk drive of FIG. 1;

FIG. 8 shows a simplified circuit diagram of an equivalent circuit for each phase pair in the 3 phase motor of FIG. 7;

FIG. 9 is a graph of a set of torque vs. rotor position curves for the 3 phase motor of FIG. 7;

FIG. 10 is a graph of a set of inductance vs. rotor position curves for the 3 phase motor of FIG. 7;

DETAILED DESCRIPTION OF THE INVENTION

Figure 1:
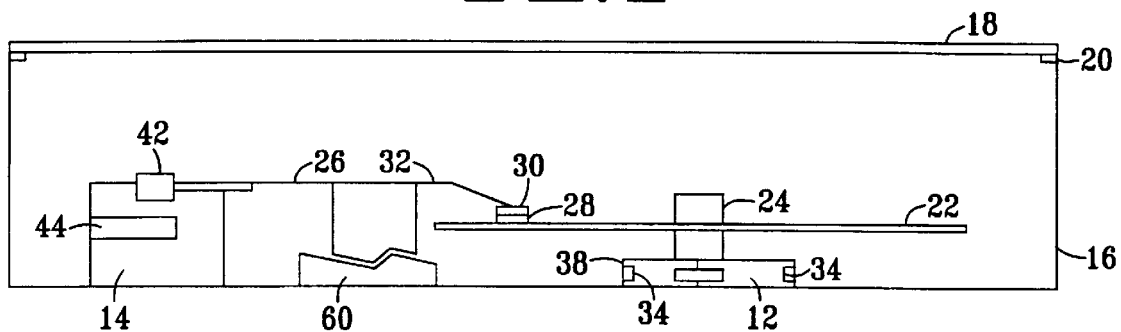
FIG. 1 shows a section view of a schematic of an embodiment of a disk drive according to the present invention.
Figure 2:
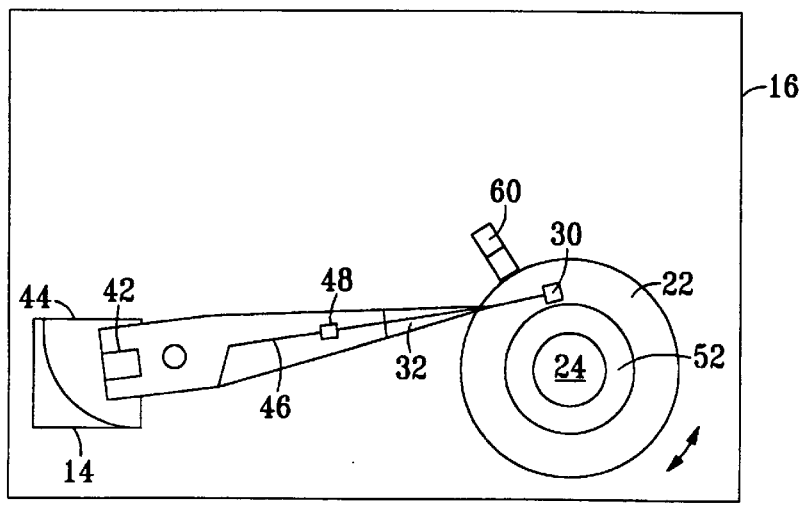
FIG. 2 shows an open top view of the disk drive of FIG. 1.

FIG. 1 shows a schematic section view of an embodiment of a disk drive 10 according to the present invention. The disk drive 10 comprises a spindle motor 12 (SPM) and an actuator 14 attached to a support 16 and covered by a cover 18. A sealing gasket 20 is placed between the cover 18 and the support 16 to provide a substantially sealed enclosure. FIG. 2 shows a top view of the disk drive 10 without the cover 18.

A data disk 22 is secured to the spindle motor 12 via a hub 24 for rotating the disk 22 when the spindle motor 12 is powered. A head carrier arm 26 is attached to the actuator 14 for carrying a transducer or read/write head 28. Specifically, the transducer is carried on an air bearing slider 30 attached to a suspension 32 on the trailing end of the head carrier arm 26. The suspension 32 urges the slider 30 and the transducer onto the surface of the disk 22. The suspension 32 allows the slider 30 to pitch and roll as it rides on an air bearing on the surface of the disk 22. The transducer can be an inductive read and write transducer or an inductive write transducer with a magneto resistive read transducer formed by thin film deposition techniques.

The spindle motor 12 is a brushless DC motor having multiple phase windings 34 arranged as a stator, and a rotor 36 having a permanent magnet or a DC current excitation winding for rotating the disk 22. The phase windings 34 are positioned in a fixed base casting 38, and the rotor 36 is rotatably disposed in the base casting 38. The permanent magnet can include a magnetic ring with north and south poles magnetized therein alternatively. Similarly, the DC excitation winding can include a set of windings positioned on the rotor 36 such that currents applied to the excitation windings create north and south poles alternately. Commutation of the spindle motor 12 is performed externally by application of currents to the phase windings 34 in sequential order to generate torque-inducing flux for moving the rotor 36 as described below.

The actuator 14 can be a rotary voice coil motor 40 (VCM) having a coil or an excitation winding 42 that can move through a stationary magnetic field 44 when a current is applied to the coil or winding. The stationary magnetic field can be provided by a permanent magnet assembly or by excitation windings. To read data from or write data onto the disk 22, the spindle motor 12 rotates the disk 22 and the VCM 40 moves the head carrier arm 26 radially across the surface of the disk 22, positioning the read/write head 28 over different data tracks on the disk 22. The signals detected from the disk 22 by the read/write head 28 flow through a flex cable 46 to a logic circuit 48 on the head carrier arm 26 for processing into data readback signals by signal amplification and processing logic. The data read back signals are routed via a cable for further processing.

The disk drive 10 can include a ramp 50 secured to the support 16 to contact the suspension 32 and lift the slider 30 away from the disk 22 when the actuator 14 rotates the slider 30 towards the periphery of the disk 22. This feature is useful for unloading the slider 30 from the disk surface when the disk drive 10 is powered down. Alternatively, the disk 22 can include a dedicated landing zone 52 in a specially textured non-data region of the disk 22 where the slider 30 is parked. The landing zone 52 is near the inside diameter of the disk 22, away from the smooth surface or data region of the disk 22. In either version, when the disk 22 is stopped, the slider 30 is parked away from the smooth surface of the disk 22 to prevent stiction. However, as described above, despite the use of a ramp 50 or a parking zone 52, the slider 30 can come into stationary contact with, and stick to, the smooth surface of the disk 22.

In order to start the spindle motor 12 and free the slider 30 in case of stiction, the disk drive 10 of the present invention includes a drive controller 54 coupled to the spindle motor 12 and to the VCM 40 for accelerating the disk 22 from standstill to a threshold speed. During the acceleration phase, the drive controller 54 performs closed loop commutation of the spindle motor 12 by periodically sampling the rotor position, and then driving the spindle motor 12 by energizing appropriate phase windings 34 relative to the rotor position that provide maximum forward torque to the rotor 36. While driving the spindle motor 12, the drive controller 54 also applies a series of current pulses to the VCM 40 to oscillate the head carrier 26 radially in and out. The simultaneous application of maximum torque to the rotor 36 and oscillation of the head carrier 26 overcomes stiction between the slider 30 and the disk 22 to rotate the disk 22.

In a closed loop commutation sequence according to the present invention, the drive controller 54 determines the rotor position during a time period $T_D$ to select those phase windings 34 which, when energized, provide maximum torque to the rotor 36 at the most beneficial time. The drive controller 54 then applies a drive current to the selected phase windings 34 during a time period $T_T$ to generate magnetic fields that induce maximum torque to the rotor 36. Therefore, at standstill, when the rotor 36 and the disk 22 are stationary, the drive controller 54 energizes those phase windings 34 that induce maximum torque to the rotor 36 to start the rotor 36 moving. This allows the drive controller 54 to start the disk 22 rotating in minimum time. Further, application of maximum torque to the rotor 36 at standstill is vital in breaking stiction between the disk 22 and the slider 30 because, as described above, the stiction coefficient is highest at standstill.

The drive controller 54 repeats the closed loop commutation sequence to ensure that the disk 22 continues moving. Otherwise, the disk 22 can come to a stop due to friction or inertial resistance. If the disk 22 does come to a stop, however short, the slider 30 sticks to the disk 22 due to stiction. Therefore, persistent application of maximum torque to the moving rotor 36 according to the present invention is essential to prevent the disk 22 from stopping and sticking to the slider 30. Further, application of maximum torque to the moving rotor 36 ensures that the disk 22 accelerates in minimum time.

During at least a portion of the time period $T_T$ in each closed loop commutation sequence, in addition to driving the spindle motor 12, the drive controller 54 oscillates the carrier 26 radially in and out to overcome stiction between the disk 22 and the slider 30 at startup. To increase the ability of the disk drive 10 to overcome stiction, preferably, the drive controller 54 oscillates the carrier 26 during the entire time period $T_T$ such that the rotor 36 is subjected to maximum induced torque and the carrier 26 is oscillated during the entire time period $T_T$.

Following the time period $T_T$, the drive controller 54 cuts off the drive current to the spindle motor 12 and the spindle motor 12 is allowed to coast. While the spindle motor 12 is coasting, the drive controller 54 again detects the position of the rotor 36 during the time period $T_D$. The drive controller 54 also stops oscillating the carrier 26 during the time period $T_D$, while the rotor position is being detected. Alternatively, the drive controller 54 can continue oscillating the head carrier 26 beyond the time periods $T_T$. The drive controller 54 can also continuously oscillate the carrier 26 during at least a portion of the time periods $T_D$ and during at least a portion of the time periods $T_T$. The drive controller 54 can also continuously oscillate the carrier 26 during the entire acceleration phase.

After the acceleration phase, the drive controller 54 commutates the spindle motor 12 by sensing back emf transitions in the stator windings 34 due to rotation of the rotor 36 relative to the stator windings 34. The back emf transitions in the stator windings 34 indicate the identity of proper phase windings 34 and the timing for energizing the phase windings 34 to apply torque to the rotor 36.

Figure 3:
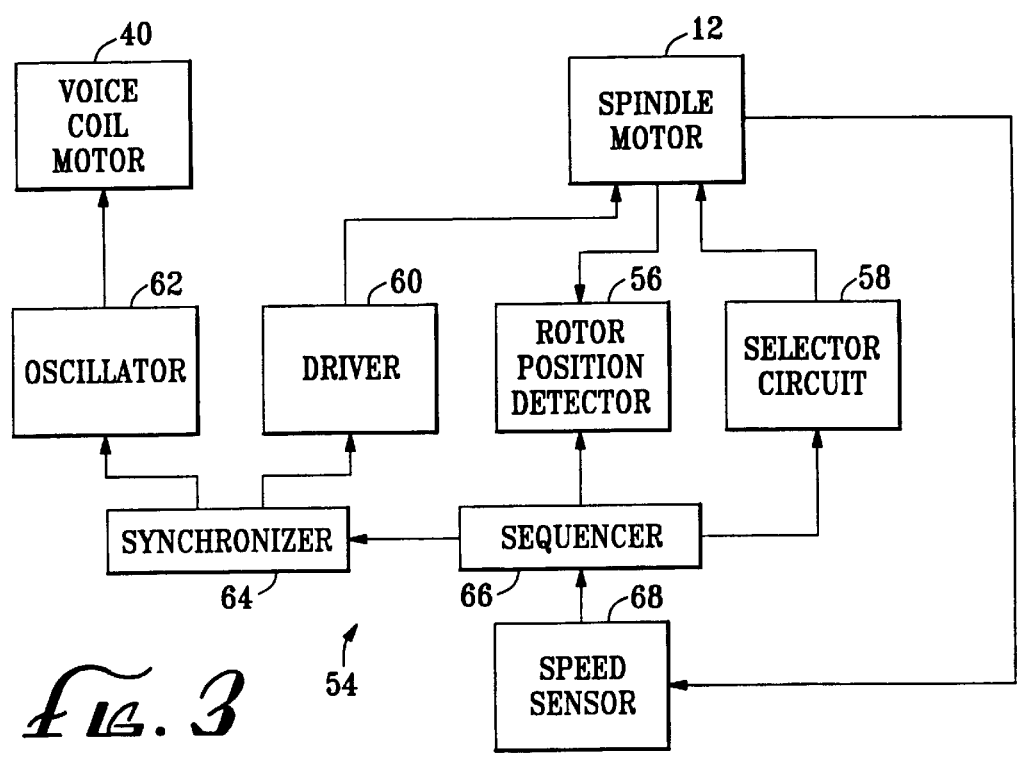
FIG. 3 shows a block diagram of an embodiment of a drive controller in the disk drive of FIG. 1 according to aspects of the present invention.

In the embodiment of the invention shown in FIG. 3, the drive controller 54 comprises: (a) a detector 56 for detecting the rotational position of the rotor 36 relative to the windings 34 during the time period $T_D$; (b) a selector circuit 58 for selectively establishing current paths through selected windings 34 capable of providing maximum torque to the rotor 36 based on the rotational position of the rotor 36 relative to the windings 34; (c) a driver 60 for applying a drive current to the selected windings 34 for the time period $T_T$ to provide torque to rotate the rotor 36; and (d) an oscillator 62 for applying a series of alternative positive and negative current pulses to the VCM 40 to oscillate the carrier 26 radially in and out during at least a portion of the time period $T_T$.

Preferably, the selector circuit 58 selectively establishes current paths through selected windings 34 capable of providing maximum forward torque to the rotor 36. As described above, in many data disk drives, it is critical for the disk 22 to rotate in a correct, or forward, direction. Energizing inappropriate phase windings 34 relative to the rotor 36 can generate magnetic fields that turn the rotor 36 in the wrong direction, damaging the slider 30 and the read/write heads 28. Preferably, the oscillator 62 generates the series of current pulses such that the positive current pulses have a pulse duration or an amplitude substantially the same as the pulse duration or amplitude, respectively, of the negative pulses.

Referring to FIG. 3, the drive controller 54 can also include a synchronizer 64 for: (i) signaling the driver 60 to apply the drive current to the selected windings 34 for the time period $T_T$, and (ii) signaling the oscillator 62 to apply the series of current pulses to the VCM 40 during at least a portion of the time period $T_T$. The drive controller 54 can also include a sequencer 66 for: (i) triggering the detector 56 to detect the rotor position during the time period $T_D$, (ii) triggering the selector circuit 58 to establish said current paths after the time period $T_D$, and (iii) triggering the synchronizer 64 to signal the driver 60 and the oscillator 62.

Figure 4:
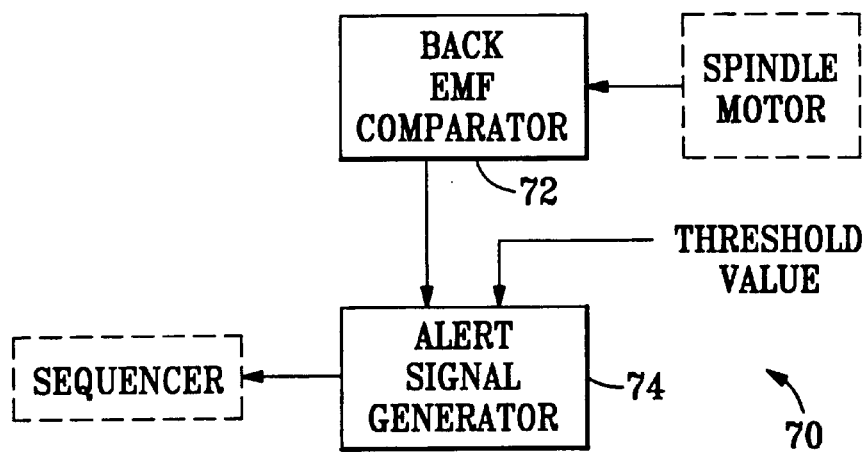
FIG. 4 shows a block diagram of an embodiment of a disk speed sensor for the drive controller of FIG. 3.

Further, a sensor 68 is included in the drive controller 54 for sensing the rotational speed of the rotor 36 and for generating an alert signal if the rotor speed is less than the threshold speed. Referring to FIG. 4, the sensor 68 can be a back emf monitor 70 for monitoring back emf signals induced in the stator windings 34 due to the rotation of the rotor 36. When the rotor 36 is moving, the change in the course and direction of the magnetic field lines emanating from the rotor magnet causes a magnetic flux through the stator windings 34, inducing a current in the stator windings 34. The current induced in the stator windings 34 is a function of the rotor speed or the frequency of magnetic transitions in the stator windings 34 due to the magnetic flux through the stator windings 34. The back emf monitor 70 includes a comparator 72 for comparing a back emf voltage across a resistor, electrically connected in series with the phase windings 34, to a threshold value corresponding to the threshold speed of the spindle motor 12. A signal generator 74 generates the alert signal if the back emf voltage is less than the threshold value, indicating either that the rotor 36 is not moving, or that its has not accelerated to the threshold speed. In response to the alert signal, the sequencer 66 triggers the detector 56, the selector circuit 58 and the synchronizer 64 to repeat the closed loop commutation and oscillation sequences described above.

Figure 5:
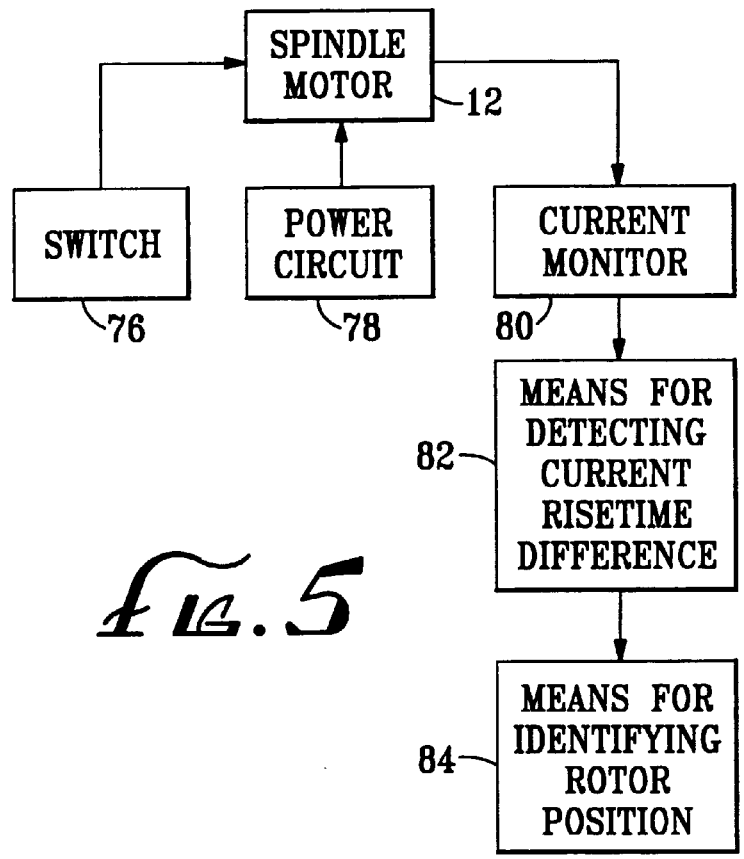
FIG. 5 shows a block diagram of an embodiment of a rotor position detector for the drive controller of FIG. 3.

Referring to FIG. 5, the detector 56 for detecting the rotor position comprises: (a) a switch 76 for selectively establishing current paths through designated windings 34; (b) a power circuit 78 for applying voltage pulses of first and second opposite polarities to each said designated winding 34; (c) a current monitor 80 for monitoring a current through the energized winding due to each of the voltage pulses of opposite polarities; (d) means 82 for determining the time difference between the rise time of the currents through the same designated winding; and (e) means 84 for identifying a rotational position of the rotor 36 relative to the windings 34 based on the sign of the time difference.

As shown in FIG. 6, an example implementation of the drive controller 54 components can be a logic circuit including a processor 86, a memory device 88 such as RAM or ROM, a VCM driver 100, and a spindle motor controller 102. The processor 86 is connected to the memory device 88 via a bus 104. The processor 86 is also electrically connected to the spindle motor controller 102 and the VCM driver 100 to control and synchronize their operations. The VCM driver 100 applies currents to the VCM 40 to control movement of the head carrier 26. The spindle motor controller 102 detects the rotor position and the rotor speed, establishes current paths through selected phase windings 34, and applies drive currents to the selected phase windings 34. Using data and program code stored in the memory device 88, the processor 86 controls starting the disk drive 10, including the process of: (i) detecting the rotor position, (ii) selectively establishing current paths through selected windings 34 capable of providing maximum torque to the rotor 36, (iii) applying currents to the selected windings 34, and (iv) applying alternative positive and negative current pulses to the voice coil motor 40, as detailed below.

To detect the rotor position, the spindle motor controller 102 performs an indirect inductance measurement in the phase windings 34. Inductance variations among the phase windings 34 is indicative of rotor position because the inductance of a phase winding is affected by proximity of the rotor 36 to the phase winding. The rotor position is then utilized to identify those phase windings 34 which, when energized, provide maximum forward torque to the rotor 36. This procedure is described below for a 3 phase, 12 pole brushless DC motor, but it is applicable to other motors as well.

FIG. 7 shows a simplified circuit diagram of the phase windings 34 of the 3 phase motor, with the motor phases designated as U, V and W. The motor has six phase pairs, UV, VU, VW, WV, UW and WU. As shown in FIG. 8, each phase pair can be represented by an equivalent series combination of an inductor L and a resistor R when the motor is at rest. A set of torque vs. rotor position curves, and a set of inductance vs. rotor position curves for the 3 phase motor are shown in FIGS. 9 and 10, respectively. Each torque curve is marked with a corresponding energized motor phase pair. For example, the torque curve marked as WV, represents the torque applied to the rotor 36 when the phase pair WV is energized by applying a voltage across the phase windings W and V. The torque curve marked as VW, represents the torque applied to the rotor 36 by applying a voltage of opposite polarity to the same phase windings. Similarly, each inductance curve is marked by a corresponding energized motor phase pair. The torque curves and the inductance curves are spatially related such that the torque curve and the inductance curve for a phase pair are $\frac{1}{4}^{th}$ of an electrical cycle out of phase, or $\frac{1}{24}^{th}$ of a mechanical revolution out of phase, as there are six electrical cycles per one mechanical revolution.

Referring to the torque curves in FIG. 9, each phase pair provides two equilibrium positions for the rotor 36, one stable, the other unstable. When a phase pair is energized, the rotor 36 drives itself to the stable equilibrium position for the phase pair. There are a total of six stable equilibrium positions and six unstable equilibrium positions corresponding to the six phase pairs. The stable equilibrium points for the six phase pairs UW, VU, V, WV, UV, and WU, are designated as $S_1$, $S_2$, $S_3$, $S_4$, $S_5$, and $S_6$, respectively. The rotor position detection (RPD) procedure described herein uses indirect inductance measurements to identify one of the above six stable equilibrium positions as the closest stable equilibrium position to the rotor's current position. The identity of the stable equilibrium position is used to commutate the motor by energizing phase pairs that provide maximum torque to the rotor 36.

The RPD procedure includes the steps of measuring the relative inductance of each phase winding by measuring the current rise times in the phase winding in response to step voltages of opposite polarities applied across the phase windings at, preferably, one rotor position. The rise time of the current in each phase pair to a current threshold value $I_{TH}$ is measured. The current threshold value $I_{TH}$ is selected to be less than a maximum current $I_{MAX}$ that can flow in the windings 34. In the example 3 phase motor, the current threshold value $I_{TH}$ is selected to be 75% of the maximum current $I_{MAX}$. Comparing the measured current rise times in different phase pairs provides a relative measure of coil inductance in different windings 34 as described below.

A phase winding current response I(t) in response to a step voltage $V_A$ can be represented by the relation:

$$I(t)=(V_A/R)-(V_A/R)e^{-Lt/R}$$

The value of the maximum current $I_{MAX}$ is equal to the ratio of the step voltage $V_A$ to the winding resistance R: $I_{MAX}=V_A/R$. As such, the current threshold $I_{TH}=V_AT/R$, where T<1. In the example 3 phase motor, T=¾. As I(t)= $T*I_{MAX}$, the time t required to reach the current threshold $I_{TH}$ is t=−L/R ln(1−T). Therefore, the current rise time is directly proportional to the winding inductance.

Figure 11:
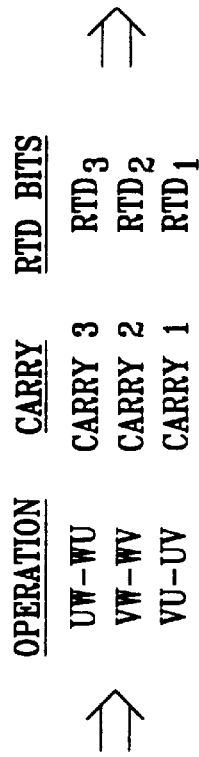
FIG. 11 is a shows an embodiment of the steps performed by the drive controller of FIG. 3 to detect rotor position.

Referring to FIG. 11, the measured current rise times for the phase pairs are subtracted one from the other, keeping track of the carry bit (RTD) in each subtraction. There are 3 carry bits designated as $RTD_1$, $RTD_2$ and $RTD_3$, forming an RTD bit sequence. The RTD bit sequence is used to lookup the closest stable equilibrium position to the rotor position, and a corresponding output state, in state table 1 below. State table 1 includes a set of six RTD bit sequences, and for each bit sequence, a corresponding output state, a phase pair, and a binary output control sequence (SCNTL). The output state numbers 1, 2, 3, 4, 5 and 6 correspond to stable equilibrium positions $S_1$, $S_2$, $S_3$, $S_4$, $S_5$, and $S_6$, respectively. The sequence of output states in table 1 from the first row of the table down, represents a commutation sequence in which the phase pairs corresponding to the output states are energized to provide maximum forward torque to the rotor 36 during normal operation. Each torque curve in FIG. 9 is marked with an output state number in state table 1, corresponding to the sequence in which the phase pair for that torque curve is energized. In the 3 phase motor, each commutation sequence represents a 360° electrical revolution and a 60° mechanical revolution.

STATE TABLE 1

| RTD BITS [3:1] | Output State | Output Phase Pair | SCNTL [1:3] |
|---|---|---|---|
| 110 | 1 | UW | 001 |
| 111 | 3 | VW | 011 |
| 011 | 2 | VU | 010 |
| 001 | 6 | WU | 110 |
| 000 | 4 | WV | 100 |
| 100 | 5 | UV | 101 |

After an output state corresponding to an RTD bit sequence is looked up in state table 1, the output state is advanced twice in the output state sequence 1, 3, 2, 6, 4 and 5 to obtain a commutation output state for commutating the motor. The corresponding phase pair in state table 1 is then energized using the associated SCNTL sequence to subject the rotor 36 to maximum forward torque.

By way of example, if the rotor 36 is initially at position A in FIG. 10, tracing the corresponding inductance curves shows that: (a) the inductance, and subsequently the current rise time, in the phase pair UV is greater than the inductance and current rise time in the phase pair WU, therefore $RTD_3=0$, (b) the inductance and current rise time in the phase pair VW is greater than the inductance and current rise time in the phase pair WV, therefore $RTD_2=0$, and (c) the inductance and current rise time in the phase pair VU is less than the inductance and current rise time in the phase pair UV, therefore $RTD_1=1$. The closest stable equilibrium position to the rotor position corresponding to the RTD bit sequence 001 in state table 1, is equilibrium position $S_6$ as designated by output state 6. The output state 6 is advanced twice in the output sequence 1, 3, 2, 6, 4 and 5 to obtain the commutation output state 5. The commutation output state 5 in state table 1 corresponds to the phase pair UV. The motor is commutated by energizing the phase pair UV using the SCNTL binary sequence 101. Referring to FIG. 9, following the dotted arrow from the stable equilibrium position $S_6$ shows that energizing the phase pair UV provides the rotor 36 with maximum forward torque.

The RPD process is performed during the time period $T_D$ and the motor is commutated during the time period $T_T$. This RPD and commutation sequence can be repeated a predetermined number of times or until the motor has accelerated to the threshold speed. After the acceleration phase, the motor can be commutated by other procedures such as sensing back emf transitions in the stator windings 34 due to rotation of the rotor 36 relative to the stator windings 34, described further below.

Figure 12:
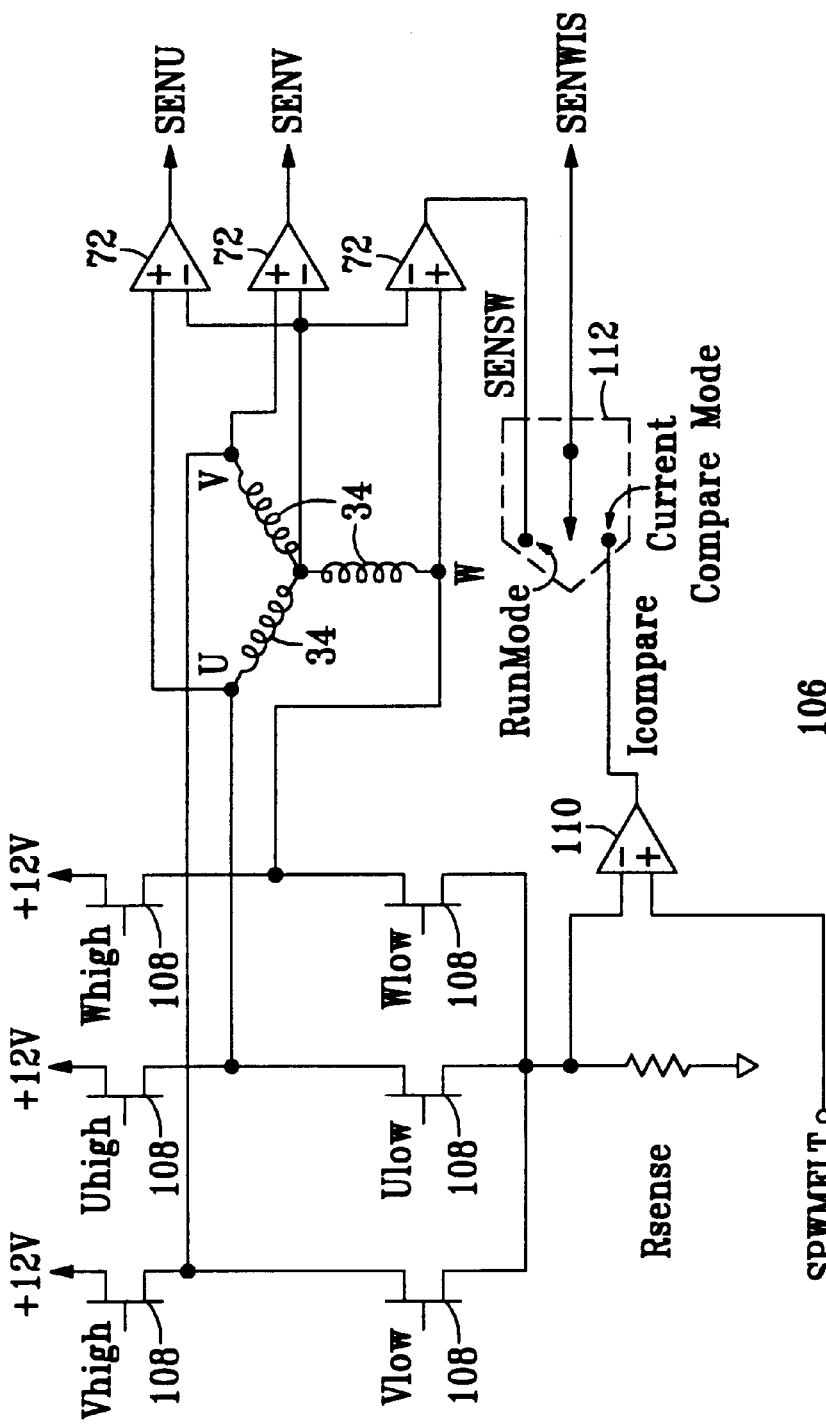
FIG. 12 is a simplified circuit diagram of an example drive circuit for commutating the 3 phase motor of FIG. 7 according to further aspects of the present invention.

FIG. 12 shows a simplified circuit diagram of an example drive circuit 106 in the spindle motor controller 102 for commutating the phase windings U, V and W during and after the acceleration phase. The drive circuit 106 comprises six transistor 108 interconnected in a H-Bridge configuration, a current sense comparator 110, three back-EMF comparators 72 and a mode switch. The H-Bridge transistors 108 can be selectively switched on and off to establish current paths through the phase windings U, V and W and to selectively energize selected phase pairs. The current sense comparator 110 is used to sense whether the phase winding currents have reached the threshold value $I_{TH}$ for each phase pair. The back emf comparators 72 are used to detect back emf signals in the phase windings 34. The mode switch 112 has a run mode position and a current compare mode position. In the run mode position, the switch allows sampling of the signals generated by the back emf comparators 72. In the current compare mode, the switch allows sampling of the signals generated by the current sense comparator 110.

During an RPD procedure, the mode switch 112 is switched to the current compare mode and the H-Bridge transistors 108 are selectively switched on and off to establish current paths through each of the six phase pairs and to apply step voltages of opposite polarities across each phase pair as described above. The step voltages can range from about ½ scale to about full scale, and preferably is about full scale. For the example 3 phase motor, the step voltage is about full scale. The threshold current $I_{TH}$ can be from about ⅜ scale to about ⅞ scale, and preferably from about ½ scale to about ¾ scale. For the example 3 phase motor, the threshold current is about ¾ scale. The actual magnitudes or values of the step voltages and the threshold current value $I_{TH}$, depend on the characteristics of the motor and the circuitry in the drive, and can be different depending on the application for which the RPD procedure is being performed. For example, in one preferred embodiment, the magnitude for full scale voltage is 12 volts, more precisely, closer to 11 volts when transistor drops are accounted for. In this application, using a 5.5 Ω resistor and 11 volts as the full scale voltage, the full scale current value is $I_{fs}$=11 volts/5.5 Ω=2 amps.

Figure 13:
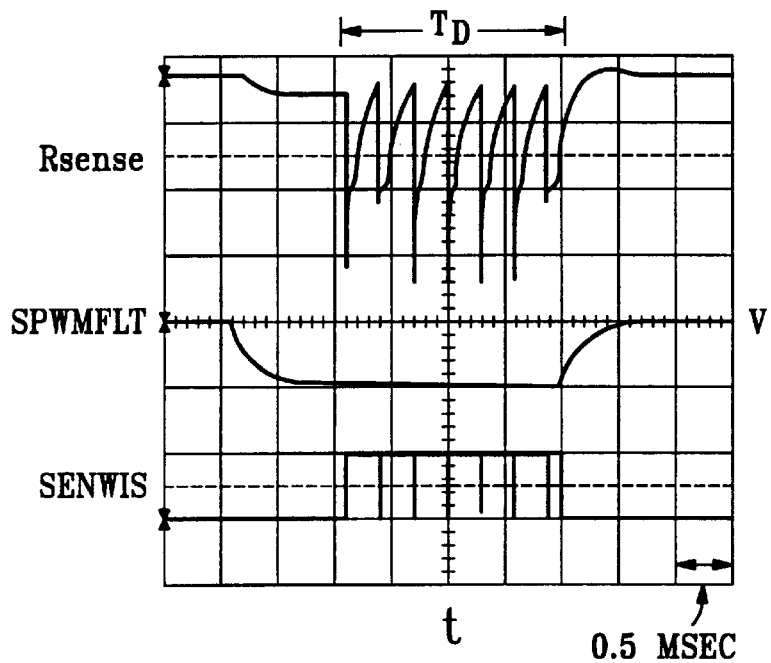
FIG. 13 is a graph of scope traces proportional to motor current and current compare signals during rotor position detection in the drive circuit of FIG. 12.

FIG. 13 shows scope traces of three of the signals in the drive circuit 106 during a RPD procedure in the acceleration phase. Trace $R_{SENSE}$ shows the voltage across the motor current sense resistor $R_{SENSE}$ over time, corresponding to six current rise times for the six phase pairs. Trace SPWMFLT shows the analog equivalent of the threshold current $I_{TH}$, at SPWMFLT in the drive circuit 106. The SPWMFLT signal serves as both the current threshold level $I_{TH}$ during an RPD process and as the drive current control signal during motor commutation. Trace SENWIS shows the output signal, SENWIS, of the current sense comparator 110 used to sense whether the motor coil current has reached the threshold value $I_{TH}$ for each phase pair. The spindle motor controller 102 measures a current rise time in each phase pair by measuring the time from the application of a voltage across the phase pair to the time the current in the phase pair reaches the threshold value $I_{TH}$ as indicated by the current sense comparator 110. The current rise times to the threshold value $I_{TH}$ in all the phase pairs are measured and then subtracted one from the other, and the commutation output state is then determined as detailed above.

Following the RPD procedure, the mode switch 112 is switched to run mode, and the H-Bridge transistors 108 are switched according to the commutation output state to energize appropriate phase windings 34 for the time period $T_T$. The binary SCNTL value associated with the commutation output state in state table 1 is decoded using a logic decoder to provide control signals for switching the H-Bridge transistors 108 to energize the appropriate phase winding.

Figure 14:
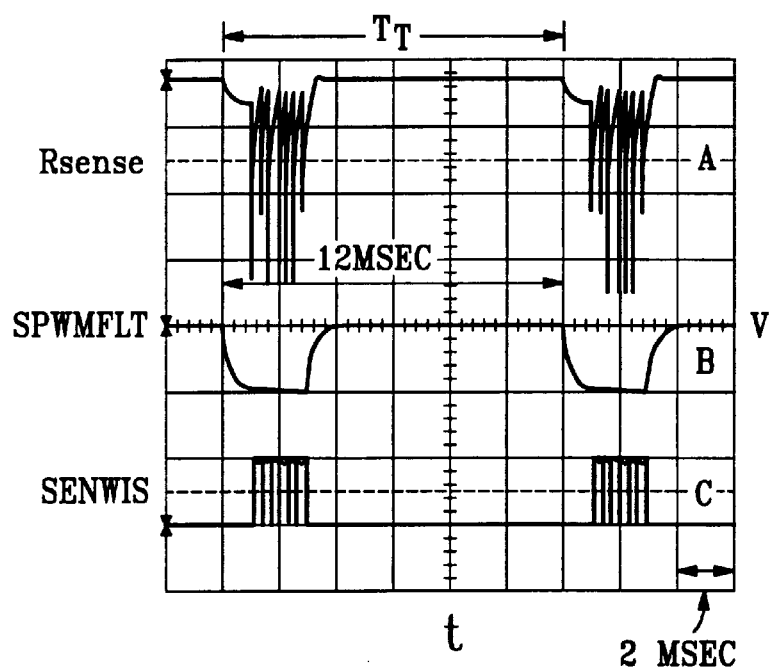
FIG. 14 is a graph of the scope traces of FIG. 12 over a longer time period.

FIG. 14 shows the scope traces for the $R_{SENSE}$, SPWMFLT and SENWIS signals over a longer time period. In this example, the RPD period $T_D$ is about 2 msec and the commutation period $T_T$ is about 10 msec. Therefore, each RPD period $T_D$ followed by a commutation period $T_T$ is about 12 msec long. The traces show two RPD periods $T_D$ spaced by a commutation period $T_T$. During approximately the first msec of the 12 msec period, the SPWMFLT signal is switched from full scale current to three quarter scale current while the motor is driven. Following the first msec, the drive current to the motor is cut off and the motor is allowed to coast for approximately 2 msec to perform an RPD procedure. Once the commutation output state is determined by the RPD procedure, the appropriate phase windings 34 are energized at full scale current to provide maximum forward torque to the rotor 36 until the next 12 msec RPD and commutation period.

The time period $T_D$ is selected to allow sufficient time for rotor position detection. The time period required for $T_D$ will vary according to the nominal winding inductance, and should be kept as short as possible. For the example 3 phase motor, the time period $T_D$ is selected to be about 2 msec to allow sufficient time for inductive sense measurements by measuring current rise times in phase windings 34 as described. As such, the time period $T_D$ can differ from 2 msec for a different rotor position detection procedure or a different spindle motor. Since the motor is coasting during the time period $T_D$, preferably the time period $T_D$ is selected to be as short as possible to allow more time for driving the motor and accelerating the disk 22.

The time period $T_T$ is selected to allow substantially maximum time to drive the motor without the rotor 36 crossing over an equilibrium position inside a $T_D+T_T$ time period. The time period $T_T$, then, is for driving the motor for the maximum amount of time during which, at top speed, the rotor 36 does not cross an equilibrium position boundary. The time period $T_T$ can be calculated from the maximum desired speed and the number of phases in the motor. For the example 3 phase motor, the time period $T_T$ is selected to be about 10 msec. The 10 msec was chosen to ensure that rotor 36 will not cross an equilibrium position inside the total 12 msec sample period. The time period $T_T$ can differ from 10 msec based on disk drive characteristics affecting rotor movement, and should be as long as possible to allow application of torque to the rotor 36 for maximum time.

An important advantage of a disk drive according to the present invention is that even if energizing selected phase windings 34 in a $T_T$ time period causes the rotor 36 to cross an equilibrium position, energizing selected phase windings 34 in the subsequent $T_T$ time period still provides the rotor 36 with forward torque, though not maximum forward torque. Further, even if energizing selected phase windings 34 in said subsequent $T_T$ time period subjects the rotor 36 to backward torque, the duration of the backward torque is limited to the time period $T_T$. In either case, at standstill, the disk 22 is provided with torque to break stiction. And, when the disk 22 is moving, it has enough inertia to coast through subsequent inductive sense measurements for rotor position detections that apply less than maximum forward torque.

In order to determine whether the motor has accelerated to the threshold speed or an operational speed, the frequency of back emf transitions in the stator windings 34 are monitored during each time period $T_T$. The frequency of back emf transitions is a measure of the rotational speed of the motor. With the mode switch 112 in the run mode, the SENWIS line is sampled to determine if a back-emf transition has occurred. The total number of sample periods between back emf transitions on the SENWIS line are tallied and stored in a running sequence. This sequence is a measurement of the period of one-half of the back-emf cycle on the SENWIS line.

To reduce any inaccuracy in motor speed measurement due to noise, the running sequence can be processed by an averaging filter according to the following relation:

$$y(i)=y(i-1)-G(y(i-1)-x(i))$$

where:

y is averaging filter output;

x is averaging filter input;

G is filter gain; and i is sequence index number.

Figure 15:
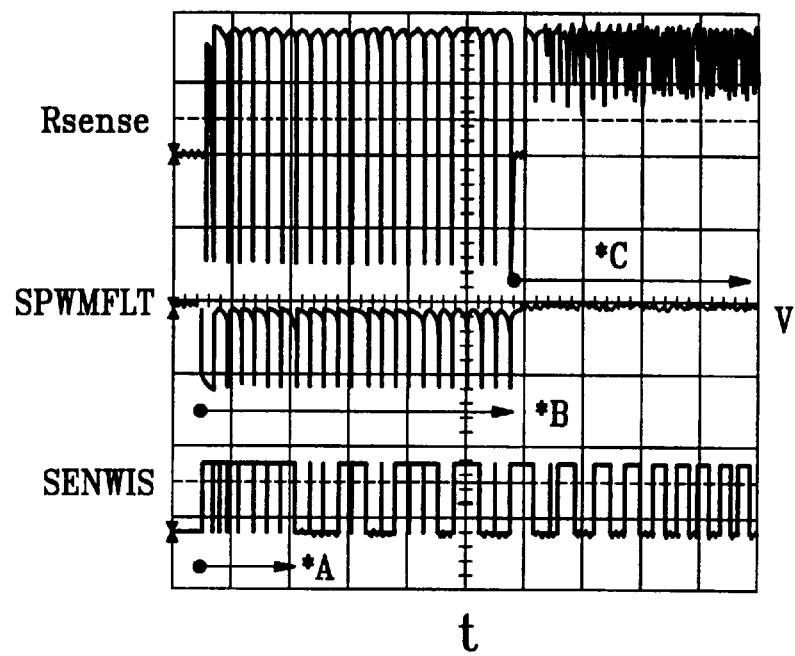
FIG. 15 is a graph of scope traces of motor current and current compare signals in the drive circuit of FIG. 12 as the motor accelerates from standstill to a final velocity.

FIG. 15 shows traces of the $R_{SENSE}$, the SPWMFLT and the SENWIS signals of the drive circuit 106 as the motor accelerates from standstill to a final velocity. Back emf transitions in the stator windings 34 are used to determine motor speed when the back emf comparators 72 begin to reliably detect back emf signals in the stator windings 34. This motor speed can range from about 2% of full speed to about 5% of full speed depending on the motor. For the 3 phase motor, back emf transitions can be reliably detected when the rotor 36 speed reaches about 100 rpm during the time period marked *A. The motor is commutated from standstill to about 200 rpm using closed loop commutation during the time period *B. Thereafter, starting with the time period *C, the motor is commutated using a state machine procedure. The threshold speed or the operational speed of the 3 phase motor can be between about 100 rpm to about 200 rpm, and in the example herein, it is selected to be 200 rpm.

The state machine procedure uses back emf transitions from the back emf comparators 72 to commutate the motor. The timing of the commutations is synchronized with back emf transitions in a phase lock loop (PLL). The state machine utilizes an up-counter and a down-counter, where the up-counter begins counting up once a back emf transition has been detected. Contents of the up-counter are divided by two and loaded into the down-counter, with the up-counter counting up and the down-counter counting down. The down counter value is used to determine when to commutate the motor by providing a delay time between a back emf transition and a motor commutation. When the down counter reaches a state advance threshold, the motor is commutated. The state machine repeats this procedure for commutating the motor after the acceleration phase.

In the 3 phase motor example, the back emf comparators 72 for the phase windings U, V and W are periodically monitored to detect back emf transitions. A back emf transition in a particular phase pair provides the commutation output state in state table 2 below. State table 2 includes a set of six phase pairs, and for each phase pair, there is listed a corresponding output state, and a binary output control sequence (SCNTL). The sequence of output states in table 2 from the first row of the table down, represents a commutation sequence in which the phase pairs corresponding to the output states are energized to provide maximum forward torque to the rotor 36 during normal operation.

STATE TABLE 2

| PHASE PAIR | OUTPUT STATE | SCNTL [1:3] |
|---|---|---|
| UW | 1 | 001 |
| VW | 3 | 011 |
| VU | 2 | 010 |
| WU | 6 | 110 |
| WV | 4 | 100 |
| UV | 5 | 101 |

The corresponding binary SCNTL value to the commutation output state in state table 2 is used to switch the H-Bridge transistors 108 to energize the appropriate phase winding to commutate the motor. The binary SCNTL value is decoded using a logic decoder to provide control signals for switching the H-Bridge transistors 108 Typically, when a back emf transition is detected, the motor is commutated 30 electrical degrees after detection of the back emf transition. As such, each commutation is delayed by 30 electrical degrees after a back emf transition is detected. In the 3 phase motor, there are 6 commutation cycles per mechanical revolution. Each commutation cycle is 360 electrical degrees and $\frac{1}{6}^{th}$ of a mechanical revolution. Each commutation cycle includes 6 commutation states in the sequence 1, 3, 2, 6, 4 and 5 as shown in state table 2.

The closed loop commutation of the spindle motor 12 during the acceleration phase described above can provide adequate starting torque to overcome stiction in many disk drives. However, in cases where large stiction forces are caused by several head carriers 26 sticking to several disks 22, the closed loop commutation may be insufficient to overcome stiction. This is typically the case for disk drives with four or more disks 22 or eight or more heads 28. As the number heads 28 stuck to the disks 22 increases, more spindle motor torque is needed to break stiction. However, in many low power systems, such as laptop computers, high power sources are unavailable. Further, application of more torque to the disk 22 can severely damage fragile disk components such as the head carrier suspension 32, the disk 22 and, the read/write heads 28. To overcome stiction in such cases, the VCM driver 100 of the present invention oscillates the head carrier 26 radially in and out while the phase windings 34 are energized. An important aspect of this procedure is that the head carrier 26 is oscillated regardless of the amount and the direction of torque applied to the disk 22. As such, the disk 22 is always provided with torque while the head carrier 26 is oscillated to break stiction.

Figure 16:
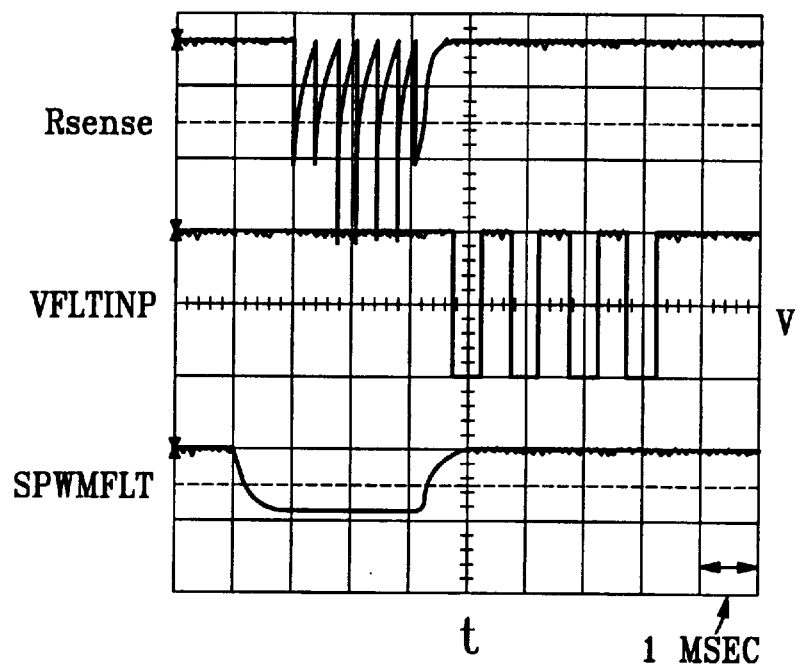
FIG. 16 is a graph of scope traces of the motor current and the voice coil motor current in the drive circuit of FIG. 12 during a portion of the acceleration phase of the motor.

The VCM driver 100 regulates power to the VCM 40 to move the head carrier 26 in one direction and then in the opposite direction at fixed intervals while torque is applied to the rotor 36. FIG. 16 shows scope traces of the RSENSE and SPWMFLT signals of the spindle motor controller drive circuit 106 and the commanded VCM current, VFLTINP, under control of the VCM driver 100. During at least a portion of the time period $T_T$, the VCM driver 100 applies a series of alternative positive and negative current pulses to the VCM 40 to oscillate the carrier 26 radially in and out. The specific amplitude and duration of the current pulses can vary depending on head/media and carrier characteristics. For the example 3 phase motor, the amplitude of the current pulses is about 1.2 amps, and eight cycles of alternating polarity are applied to the VCM 40 with a duration of about 500 μsec per cycle. Therefore, the head carrier 26 is oscillated for at least about 4 msec. During this time period, the motor is also driven by energizing appropriate phase windings 34 at full current to provide maximum torque to the rotor 36. The number and duration of the cycles, and the amplitude of the pulses, are implementation dependent and can vary depending on disk drive specifications. The frequency, and amplitude of the pulses should be selected to free the sliders 30 without damaging fragile drive components such as the head arm carrier suspension 32.

Although a head carrier oscillation procedure has been fully described herein, the present invention contemplates other oscillation procedures usable in conjunction with performing closed loop commutations according to the present invention. Therefore, the process of starting and accelerating the disk drive 10 according to the present invention is not limited to the oscillation procedure described above. For example, the oscillation procedure can include: (i) applying positive current pulses of higher amplitude than that of the negative current pulses, (ii) applying positive current pulses of longer duration than that of the negative current pulses, or (iii) varying the amplitude and/or frequency of the current pulses based on the resonant frequency of the actuator system which includes the VCM coil, the head carriers 26, and the sliders 30.

Preferably, program instructions and data are stored in the memory device 88 for use by the processor 86 to interact with the VCM driver 100 and the spindle motor controller 102 to control starting the disk drive 10, including the process of: (i) detecting the rotor position, (ii) selectively establishing current paths through selected windings 34 capable of providing maximum torque to the rotor 36, (iii) applying currents to the selected windings 34, and (iv) applying alternative positive and negative current pulses to the voice coil motor 40, as detailed above. Alternatively, the processor 86 can include a microprocessor and internal memory containing microcode and data configuring the processor 86 to interact with the VCM driver 100 and the spindle motor controller 102 to perform the above steps. Timing and synchronization by the processor 86 can be provided by timers in the processor 86, or external timers. The processor 86 can also include dedicated counters, or program instructions for emulating counters.

The processor 86 is electrically connected to the drive circuit 106 to sample currents and/or voltages from the current comparator 110 and back emf comparators 72, and to provide timing and control signals to the H-Bridge transistors 108 and the mode switch 112 to commutate the motor. In connecting the processor 86 to the drive circuit, digital-to-analog converters (D/A) can be used to convert digital signals from the processor 86 to analog signals, and analog-to-digital converters (A/D) can be used to convert analog signals from the drive circuit 106 to digital signals. The processor is also electrically connected to the VCM driver 100 using A/D converters to provide control signals to the VCM driver 100 to deliver current pulses to the VCM coil for oscillating the head carrier 26 under the processor control.

Figure 17:
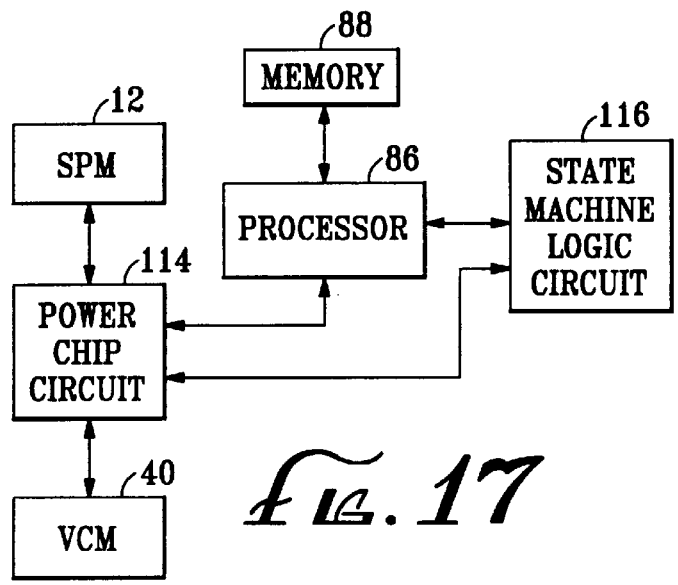
FIG. 17 shows a block diagram of another example implementation of the drive controller of FIG. 3.

The spindle motor controller circuitry, including the drive circuit 106, and the VCM driver circuitry can be implemented in an power chip circuit 114 as shown in FIG. 17. Further, the state machine procedure described above can be programmed into a logic circuit 116 to perform post-acceleration commutation. The state machine logic circuit 116 is electrically interconnected to the drive circuit 106 in the power chip circuit 114 to sample currents and/or voltages from the back emf comparators 72, and to provide timing and control signals to the H-Bridge transistors 108 to commutate the motor. In connecting the state machine logic circuit to the drive circuit, D/A converters can be used to convert digital signals from the state machine logic circuit to analog signals, and A/D converters can be used to convert analog signals from the drive circuit 106 to digital signals. The state machine procedure can also be programmed into the memory device 88 interconnected to a processor 86 for performing post-acceleration commutation of the motor.

The state machine logic circuit 116 can be implemented as an Application Specific Integrated Circuit (ASIC). An ASIC is a device designed to perform a specific function as opposed to a device such as a microprocessor which can be programmed to performed a variety of functions. The circuitry for making the chip programmable is eliminated and only those logic functions needed for a particular application are incorporated. As a result, the ASIC has a lower unit cost and higher performance since the logic is implemented directly in the chip rather than using an instruction set requiring multiple clock cycles to execute. An ASIC is typically fabricated using CMOS technology with custom, standard cell, physical placement of logic (PPL), gate array, or field programmable gate array (FPGA) design methods.

Alternatively, program instructions and data can be used to program a spindle motor controller logic circuit 118 to perform the steps taken by the spindle motor controller 102 as detailed above. For example, the logic circuit can be programmed to perform the steps of detecting the rotor position and the rotor speed, establishing current paths through selected phase windings 34, and applying drive currents to the selected phase windings 34, as described above. The spindle motor controller logic circuit 118 is electrically interconnected to the drive circuit 106 to sample currents and/or voltages from the current comparator 110 and back emf comparators 72, and to provide timing and control signals to the H-Bridge transistors 108 and the mode switch 112 to commutate the motor. Program instructions and data are stored in the memory device 88 for use by the processor 86 to interact with the spindle motor controller logic circuit 118 and to send control signals to the VCM driver 100 to apply alternative positive and negative current pulses to the voice coil motor 40 to oscillate the head carrier 26 as described above. The state machine logic circuit 116 is electrically interconnected to drive circuit 106, to the processor 86, and to the spindle motor controller logic circuit 118 to perform post-acceleration commutation of the motor.

Similarly, program instructions and data can be used to program a VCM driver logic circuit 120 to perform the steps of oscillating the head carrier 26 as detailed above. The logic circuit is electrically connected to the VCM 40 for providing said series of current pulses of opposite polarity to the VCM coil. The processor 86 provides timing and synchronization signals to the spindle motor controller 102, to the VCM driver logic circuit 120, and to the state machine logic circuit 116. The spindle motor controller 102 and the VCM driver logic circuit 120 can also synchronize their operation through timing and synchronization signals between themselves.

Other means, comprising processors, logic circuits, and/or analog circuits, for performing the steps taken by the drive controller 54 of the present invention are possible and contemplated by the present invention. Examples of microprocessors which can be used are Motorola's MC68000 family and Intel's 80X86 family of microprocessors. Examples of microcontrollers are Motorola's M6833XX family, Motorola's M68HCXX family and Intel's 8051 and derivatives thereof. Additionally, examples of digital signal processors are Analog Devices' ADSP21XX family, Mororola's DSP56XXX family and Texas Instrument's TMS320CXX family. Therefore, a drive controller 54 according to the present invention should not be limited to the descriptions of the versions described herein.

Similarly, although a rotor position detection procedure has been fully described herein, the present invention contemplates other rotor position detection procedures usable in performing closed loop commutations according to the present invention. Therefore, the closed loop commutation procedure performed by the drive controller 54 is not limited to the RPD procedure described above.

Further, although in the embodiment of the disk drive 10 of the present invention shown in FIG. 1, the disk drive 10 includes one disk 22, the present invention also contemplates disk drives including: (i) a plurality of disks 22 separated by spacer rings and stacked on the hub 24, and (ii) a plurality of read/write heads 28 supported by carriers 26 attached to the VCM 40 for moving the head carriers 26 across the disks 22. As described above, each head carrier 26 includes an air-bearing slider 30 that rides on a bearing of air above a disk surface when the disk 22 is rotating at its operational speed. The disks 22 can be coated with a thin film of lubricant such as perfluoropolyether lubricant. The disks 22 can be magnetic disks, including zone textured media disks.

Figure 18:
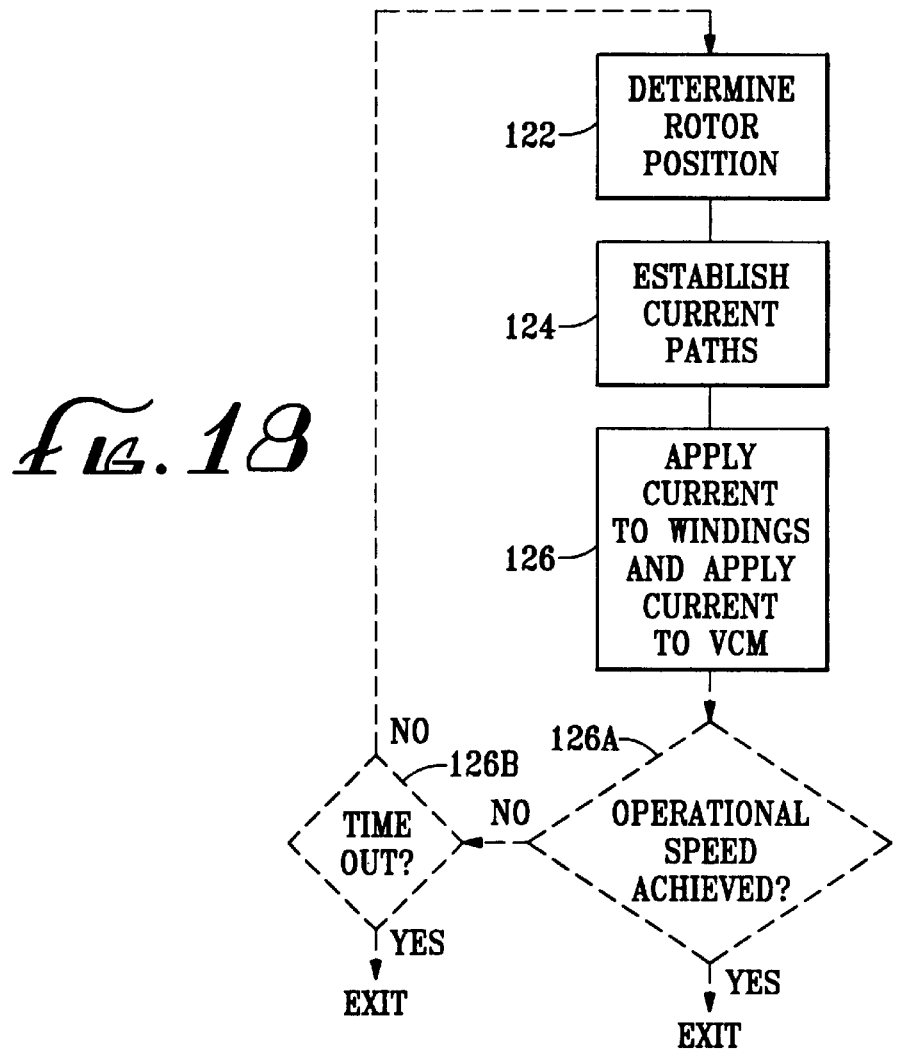
FIG. 18 is a flow chart of an embodiment of a method for accelerating a disk drive from standstill to a threshold speed according to the present invention.

Referring to FIG. 18, in another aspect, the present invention discloses a method for accelerating the spindle motor 12 of the disk drive 10 from standstill to a threshold speed by: (a) determining a rotational position of the rotor 36 relative to the phase windings 34 during a time period $T_D$ in step 122; (b) selectively establishing current paths through selected windings 34 capable of providing maximum torque to the rotor 36 based on the rotational position of the rotor in step 124; (c) applying a current to the selected windings 34 for a time period $T_T$ to provide maximum torque to rotate the rotor 36 in step 126; and (d) applying a series of alternative positive and negative current pulses to the VCM 40 to oscillate the carrier 26 radially in and out during at least a portion of the time period $T_T$ in step 126. Steps 122–126 can be repeated until the motor has accelerated to the threshold speed in step 126a or a timeout occurs in step 126b.

Figure 19:
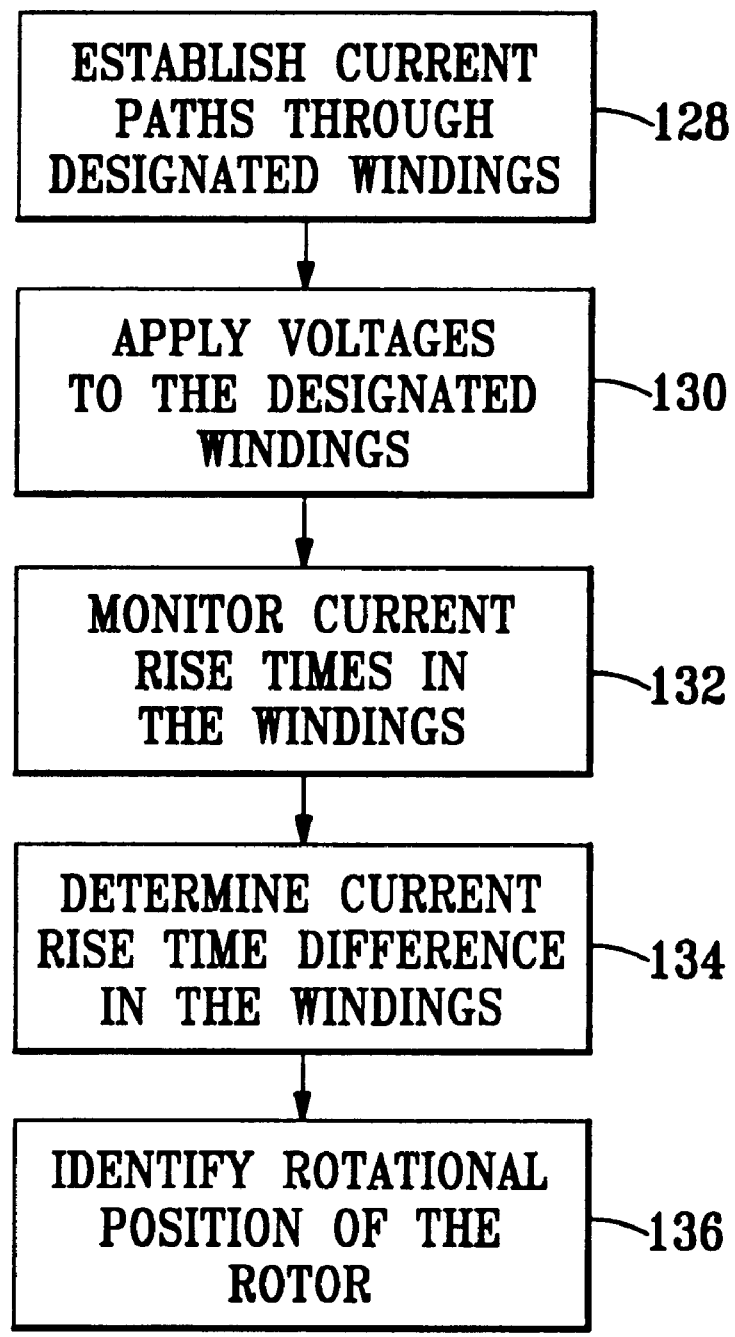
FIG. 19 is a flow chart of an embodiment of the steps of detecting rotor position in the method of FIG. 18.

FIG. 19 is a flowchart of the step of determining the rotor position by: (i) selectively establishing current paths through designated windings 34 in step 128; (ii) applying voltage pulses of first and second opposite polarities to each said designated winding during the time period $T_D$ in step 130; (iii) monitoring a current through the energized winding due to each of the voltage pulses of opposite polarities in step 132; (iv) determining the time difference between the rise time of the currents through the same designated winding in step 134; and (v) identifying a rotational position of the rotor 36 relative to the windings 34 based on the sign of the time difference in step 136.

Figure 20:
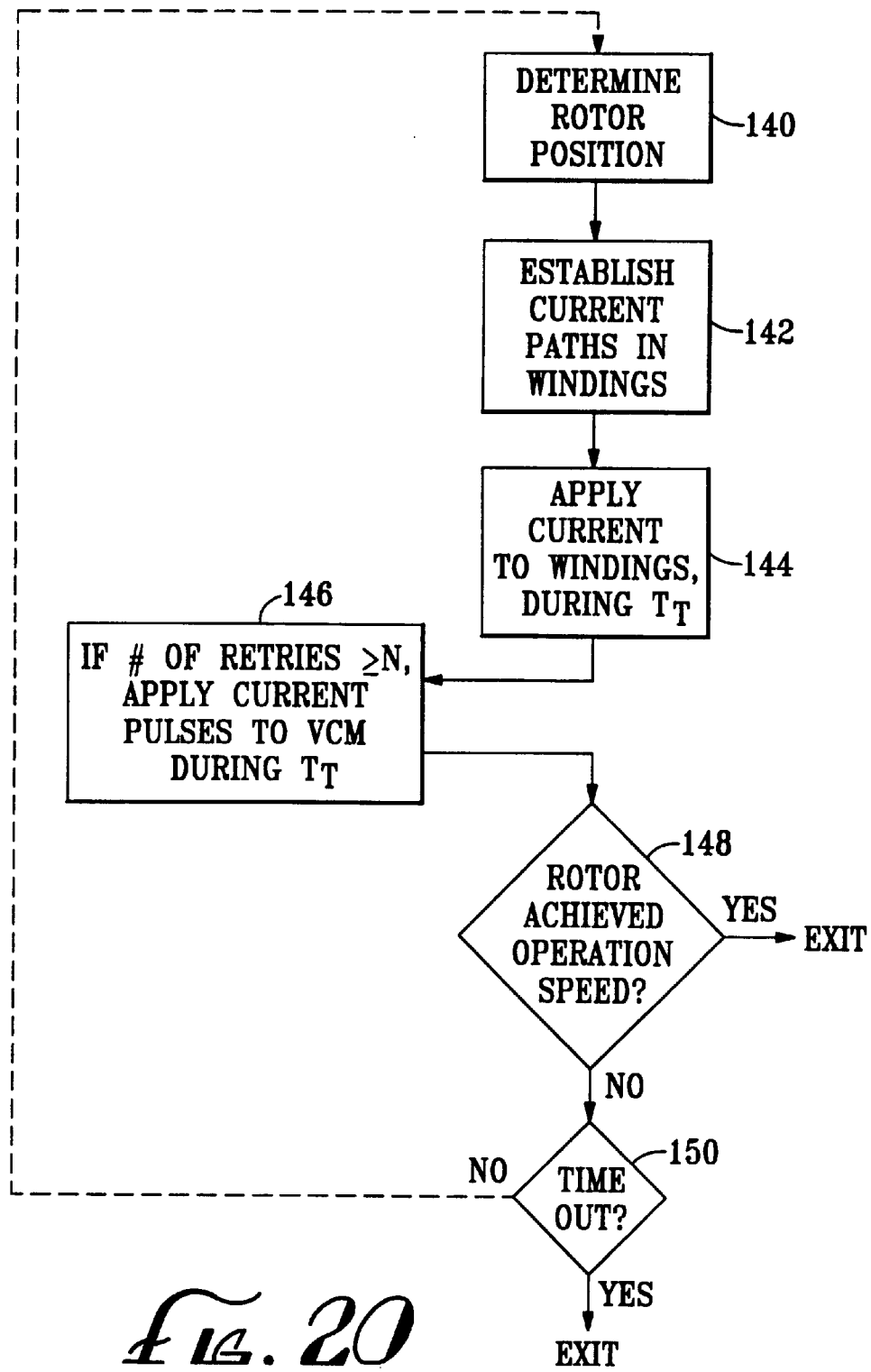
FIG. 20 is a flow chart of another embodiment of a method for accelerating a disk drive from standstill to a threshold speed according to the present invention.

In another embodiment, shown in FIG. 20, the method of the present invention comprises the steps of: (a) determining a rotational position of the rotor 36 relative to the windings 34 during a time period $T_D$ in step 140; (b) selectively establishing current paths through selected windings 34 capable of providing maximum torque to the rotor 36 based on the rotational position of the rotor 36 in step 142; and (c) applying a current to the selected windings 34 for a time period $T_T$ to provide maximum torque to rotate the rotor 36 in step 144. If after a predetermined number N of repetitions of steps 140–144 the motor has not accelerated to the threshold speed, a series of alternative positive and negative current pulses are applied to the VCM 40 to oscillate the carrier 26 radially in and out during at least a portion of the time period $T_T$ in step 146. This process can be repeated until the motor has accelerated to the threshold speed in step 148 or a timeout occurs in step 150.

Figure 21A:
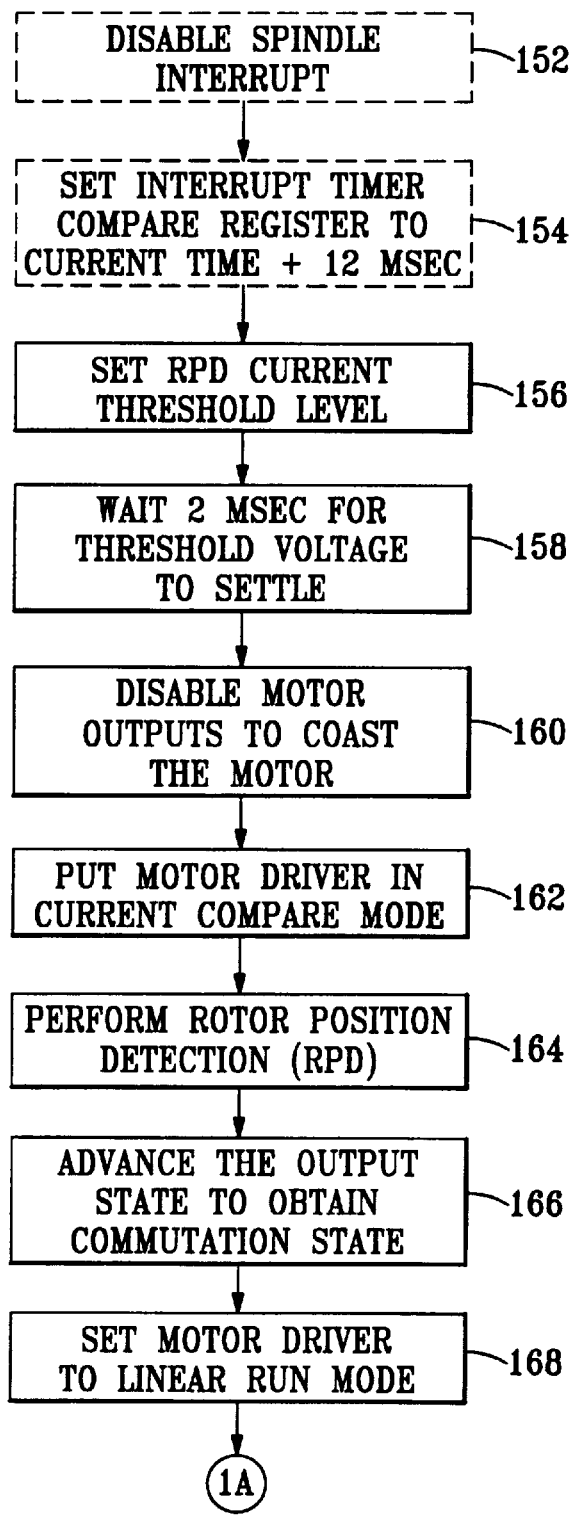
FIGS. 21a–21c show a flow chart of an example spindle motor closed loop commutation and head carrier oscillation process according to further aspects of the present invention.
Figure 21B:
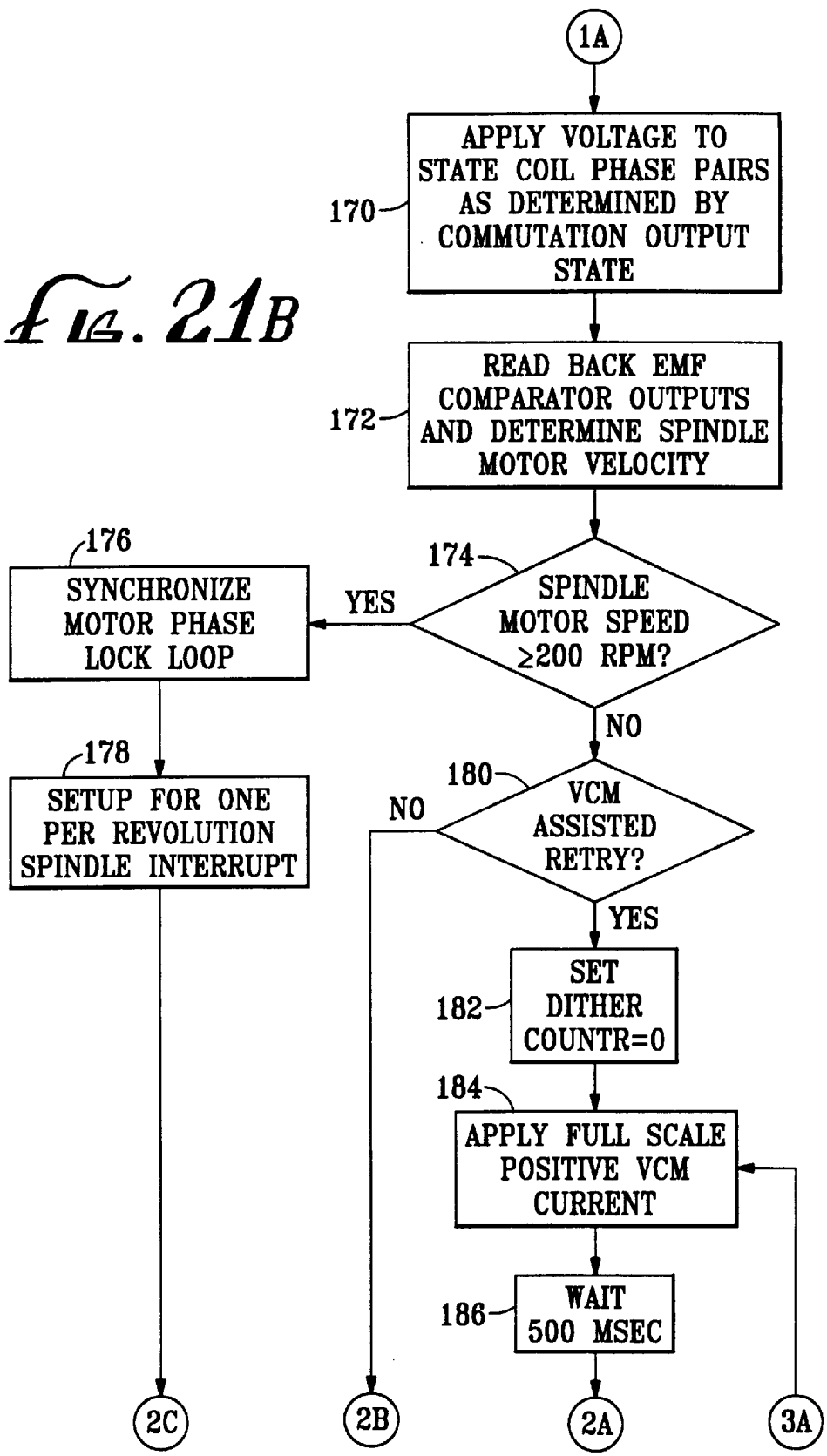
Figure 21C:
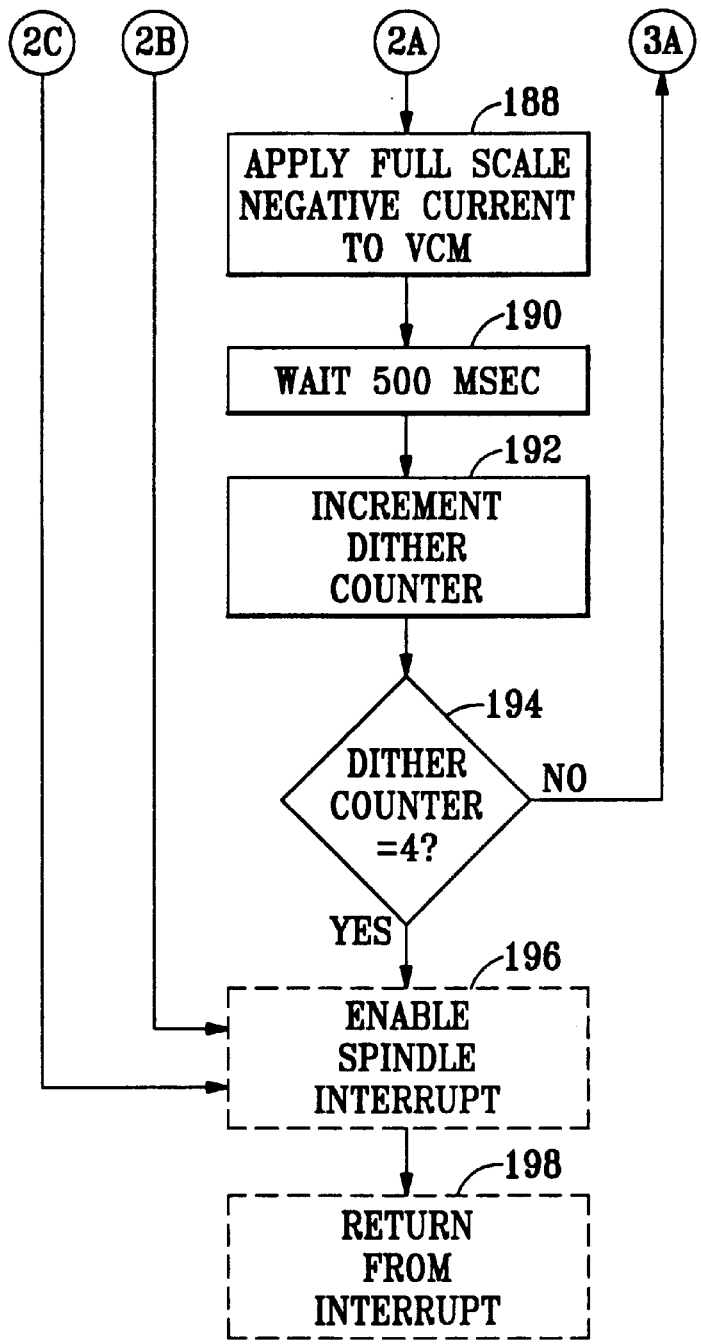

With reference to FIGS. 21a–21c, in conjunction with FIGS. 3, 11, 12, 16, and 20, an example spindle motor commutation and head carrier oscillation process according to the present invention includes the following steps performed periodically: Setting the current threshold value $I_{TH}$ to a desired value in step 156, entering a delay loop for 2 msec to allow the threshold voltage to settle in step 158, disabling power to the spindle motor 12 to allow the motor to coast in step 160, switching the drive circuit mode switch 112 in current compare mode in step 162, detecting the rotor position and obtaining a commutation output state using an RPD sequence in steps 164 and 166, switching the drive circuit mode switch 112 to run mode in step 168, applying a voltage to phase windings 34 corresponding to the commutation output state in step 170, and monitoring back emf transitions detected by back emf comparators 72 of the drive circuit 106 and determining motor velocity in step 172. Thereafter, comparing the motor speed to the threshold speed in step 174 and if the motor speed is greater than or equal to the threshold speed, proceeding to a post-acceleration phase commutation of the motor in steps 176 and 178. If the motor speed is less than the threshold speed, and the commutation process includes an oscillation sequence in step 180, the process begins an oscillation sequence with step 182, otherwise, the spindle motor commutation process ends.

Oscillating or dithering the head carrier 26 includes: Setting a dither counter to zero in step 182, applying a full scale positive current to the VCM 40 in step 184, entering a delay loop for about 500 μsec in step 186, applying a full scale negative current to the VCM 40 in step 188, entering a delay loop for about 500 μsec in step 190, incrementing the dither counter in step 192, checking if the dither counter has reached a maximum repeat count in step 194, if not, proceeding to step 184 to repeat dithering, otherwise, ending the spindle motor commutation process.

The spindle commutation process described above can be repeated periodically, or in response to a spindle motor commutation interrupt procedure. In the latter case, step 156 is preceded with disabling the spindle motor interrupt in step 152 and setting an interrupt timer compare register to the current time plus 12 msec in step. Further, step 194 is followed by enabling the spindle motor interrupt in step 196 and exiting from the spindle motor commutation interrupt procedure in step 198.

The present invention also discloses a software system comprising program instructions to perform the steps shown in FIGS. 18–21c and described above in conjunction with the method of the present invention. The software system can be implemented using a high level programming language such as C, Pascal, etc. which is then compiled into object code and linked with object libraries as necessary to generate executable code for the processor 86. The software system can also be implemented using an assembly language which is then assembled into object code and linked with object libraries as necessary to generate executable code.

The executable code can be stored in the memory device 88 of the example controller 54 for program execution by the processor 86. The executable code can also be stored in the processor 86 as microcode, or used to implement the logic circuits for the spindle motor controller 102, the VCM driver 100, and the state machine logic circuit 116 described above. The memory device 88 and logic circuits can further include data used by the processor 86, such as state tables 1 and 2, the duration of the time periods $T_D$ and $T_T$, the operational or threshold speed of the rotor 36, the threshold value used by the back emf detectors, the threshold current value used by the current sensor, the number of times closed commutations are repeated without oscillating the carrier 26, the number of times the closed commutations are repeated with oscillating the carrier 26, the duration and amplitude of the oscillator pulses.

Although the present invention has been described in considerable detail with regard to the preferred versions thereof, other versions are possible. Therefore, the appended claims should not be limited to the descriptions of the preferred versions contained herein.

What is claimed is:

1. A data disk drive comprising:
   (a) at least one data disk;
   (b) a brushless DC motor coupled to the data disk, the motor having: (i) multiple phase windings arranged as a stator, and (ii) a rotor having a permanent magnet or a DC current excitation winding for rotating the at least one data disk;
   (c) a transducer for writing data to or reading data from the at least one data disk;
   (d) a carrier supporting the transducer;
   (e) a voice coil motor coupled to the carrier for moving the carrier radially across the at least one data disk;
   (f) a drive controller coupled to the brushless DC motor and to the voice coil motor, the drive controller comprising: (i) a detector for detecting a rotational position of the rotor relative to the multiple phase windings during a time period $T_D$; (ii) a selector circuit for selectively establishing current paths through selected windings of the multiple phase windings capable of providing maximum torque to the rotor based on the rotational position of the rotor relative to the multiple phase windings; (iii) a driver for applying a drive current to the selected windings for a time period $T_T$ to provide maximum torque to rotate the rotor; and (iv) an oscillator for applying a series of alternative positive and negative current pulses to the voice coil motor to oscillate the carrier radially in and out during at least a portion of the time period $T_T$; and
   (g) a support for supporting the brushless DC motor, the voice coil motor and the drive controller.

2. The disk drive of claim 1, wherein the controller further comprises a synchronizer for: (i) signaling the driver to apply the drive current to the selected windings for the time period $T_T$, and (ii) signaling the oscillator to apply the series of current pulses to the voice coil motor during at least the portion of the time period $T_T$.

3. The disk drive of claim 2, wherein the controller further comprises a sequencer for: (i) triggering the detector to detect the rotor position during the time period $T_D$, (ii) triggering the selector circuit to establish said current paths after the time period $T_D$, and (iii) triggering the synchronizer to signal the driver and the oscillator.

4. The disk drive of claim 3, wherein the controller further comprises a sensor for sensing the rotational speed of the rotor and for generating an alert signal if the rotor speed is less than an operational speed of the rotor;
   wherein the sequencer triggers the detector, the selector circuit and the synchronizer in response to the alert signal.

5. The disk drive of claim 3, wherein the controller further comprises a monitor for monitoring a back electromotive force induced in the multiple phase windings due to a magnetic flux by a rotation of the rotor relative to the multiple phase windings, the monitor including a comparator for generating pulses when the back electromotive force exceeds a threshold value, the frequency of said pulses corresponding to an operational speed of the rotor.

6. The disk drive of claim 1, wherein the oscillator generates the series of current pulses such that the positive current pulses have a pulse duration or an amplitude substantially the same as the pulse duration or amplitude, respectively, of the negative pulses.

7. The disk drive of claim 1, wherein the selector circuit selectively establishes the current paths through the selected windings capable of providing maximum forward torque to the rotor.

8. The disk drive of claim 1, wherein the detector comprises:
   (a) a switch for selectively establishing current paths through designated windings;
   (b) a power circuit for applying voltage pulses of first and second opposite polarities to each said designated winding;
   (c) a current monitor for monitoring a current through the energized designated windings due to each of the voltage pulses of opposite polarities;
   (d) means for determining the time difference between the rise time of the currents through the same designated winding; and
   (e) means for identifying a rotational position of the rotor relative to the designated windings based on the sign of the time difference.

9. The disk drive of claim 1, wherein the carrier is an air-bearing slider.

10. A data disk drive comprising:
    (a) a plurality of data disks;
    (b) a brushless DC motor coupled to the data disks, the motor having: (i) multiple phase windings arranged as a stator, and (ii) a rotor having a permanent magnet or a DC current excitation winding for rotating the data disks;
    (c) a plurality of transducers for writing data to or reading data from the data disks;
    (d) a plurality of carriers, each of the carriers supporting at least one transducer;
    (e) a voice coil motor coupled to the carriers for moving the carriers radially across the data disks;
    (f) a drive controller coupled to the brushless DC motor and to the voice coil motor, the drive controller comprising: (i) a detector for detecting a rotational position of the rotor relative to the multiple phase windings during a time period $T_D$; (ii) a selector circuit for selectively establishing current paths through selected windings of the multiple phase windings capable of providing maximum torque to the rotor based on the rotational position of the rotor relative to the multiple phase windings; (iii) a driver for applying a drive current to the selected windings for a time period $T_T$ to provide maximum forward torque to rotate the rotor; and (iv) an oscillator for applying a series of alternative positive and negative current pulses to the voice coil motor to oscillate the carriers radially in and out during at least a portion of the time period $T_T$; and
    (g) a support for supporting the brushless DC motor, the voice coil motor and the drive controller.

11. The disk drive of claim 10, wherein the controller further comprises a synchronizer for: (i) signaling the driver to apply the drive current to the selected windings for the time period $T_T$, and (ii) signaling the oscillator to apply the series of current pulses to the voice coil motor during at least the portion of the time period $T_T$.

12. The disk drive of claim 11, wherein the controller further comprises a sequencer for: (i) triggering the detector to detect the rotor position during the time period $T_D$, (ii) triggering the selector circuit to establish said current paths after the time period $T_D$, and (iii) triggering the synchronizer to signal the driver and the oscillator.

13. The disk drive of claim 12, wherein the controller further comprises a sensor for sensing the rotational speed of the rotor and for generating an alert signal if the rotor speed is less than an operational speed of the rotor;

wherein the sequencer triggers the detector, the selector circuit and the synchronizer in response to the alert signal.

14. A drive controller for driving a data recording disk drive including at least one data disk, a brushless DC motor having multiple phase windings arranged as a stator and a rotor having a permanent magnet or a DC current excitation winding for rotating the at least one disk, a transducer for writing data to or reading data from the at least one disk, a carrier supporting the transducer, and a voice coil motor for moving the carrier radially across the at least one disk, the controller comprising:

(a) a detector for detecting a rotational position of the rotor relative to the multiple phase windings during a time period $T_D$;

(b) a selector circuit for selectively establishing current paths through selected windings of the multiple phase windings capable of providing maximum torque to the rotor based on the rotational position of the rotor relative to the multiple phase windings;

(c) a driver for applying a drive current to the selected windings for a time period $T_T$ to provide maximum torque to rotate the rotor; and (d) an oscillator for applying a series of alternative positive and negative current pulses to the voice coil motor to oscillate the carrier radially in and out during at least a portion of the time period $T_T$.

15. The controller of claim 14 further comprising a synchronizer for: (i) signaling the driver to apply the drive current to the selected windings for the time period $T_T$, and (ii) signaling the oscillator to apply the series of current pulses to the voice coil motor during at least the portion of the time period $T_T$.

16. The controller of claim 15, further comprising a sequencer for: (i) triggering the detector to detect the rotor position during the time period $T_D$, (ii) triggering the selector circuit to establish said current paths after the time period $T_D$, and (iii) triggering the synchronizer to signal the driver and the oscillator.

17. The controller of claim 16, further comprising a sensor for sensing the rotational speed of the rotor and for generating an alert signal if the rotor speed is less than an operational speed of the rotor;

wherein the sequencer triggers the detector, the selector circuit and the synchronizer in response to the alert signal.

18. The controller of claim 16, further comprising a monitor for monitoring a back electromotive force induced in the multiple phase windings due to a magnetic flux by a rotation of the rotor relative to the multiple phase windings, the monitor including a comparator for generating pulses when the back electromotive force exceeds a threshold value, the frequency of said pulses corresponding to an operational speed of the rotor.

19. The controller of claim 14, wherein the oscillator generates the series of current pulses such that the positive current pulses have a pulse duration or an amplitude substantially the same as the pulse duration or amplitude, respectively, of the negative pulses.

20. The controller of claim 14 wherein the selector circuit selectively establishes the current paths through the selected windings capable of providing maximum forward torque to the rotor.

21. The controller of claim 14 wherein the detector comprises:

(a) a switch for selectively establishing current paths through designated windings;

(b) a power circuit for applying voltage pulses of first and second opposite polarities to each said designated winding;

(c) a current monitor for monitoring a current through the energized designated windings due to each of the voltage pulses of opposite polarities;

(d) means for determining the time difference between the rise time of the currents through the same designated winding; and (e) means for identifying a rotational position of the rotor relative to the designated windings based on the sign of the time difference.

22. A drive controller for driving a data recording disk drive comprising at least one data disk, a brushless DC motor having multiple phase windings arranged as a stator and a rotor having a permanent magnet or a DC current excitation winding for rotating the at least one data disk, a transducer for writing data to or reading data from the at least one data disk, a carrier supporting the transducer, and a voice coil motor for moving the carrier radially across the at least one data disk, the controller comprising:

a logic circuit electrically interconnected to the DC motor and to the voice coil motor, the logic circuit being configured by program instructions to perform the steps of:

(1) determining a rotational position of the rotor relative to the multiple phase windings during a time period $T_D$;

(2) selectively establishing current paths through selected windings of the multiple phase windings capable of providing maximum torque to the rotor based on the rotational position of the rotor;

(3) applying a current to the selected windings for a time period $T_T$ to provide maximum torque to rotate the rotor; and (4) applying a series of alternative positive and negative current pulses to the voice coil motor to oscillate the carrier radially in and out during at least a portion of the time period $T_T$.

23. The controller of claim 22, wherein the logic circuit comprises:

(a) one or more memory devices containing said program instructions; and (b) one or more processors electrically interconnected to the DC motor, to the voice coil motor, and to said one or more memory devices, for executing the program instructions.

24. The controller of claim 23, further comprising a commutation logic circuit electrically interconnected to the DC motor and to the respective one or more processors, the commutation logic circuit being configured by program instructions for performing the steps of:

(a) measuring time between pulses generated by back electromotive forces induced in the multiple phase windings due to a magnetic flux by a rotation of the rotor relative to the multiple phase windings; and (b) if the time between pulses corresponds to a rotor speed substantially equal to or greater than a minimum allowable speed of the rotor: (i) identifying windings capable of providing maximum forward torque to the rotor based on the induced back electromotive force in the multiple phase windings, and (ii) applying a current to the identified windings to rotate the rotor.

25. The controller of claim 22, wherein the logic circuit program instructions further include program instructions for:
   (a) monitoring the rotation speed of the rotor; and
   (b) repeating program instruction steps (1)–(4) if the rotor speed is less than an operational speed of the rotor.

26. The controller of claim 22, wherein the logic circuit program instructions further include program instructions for:
   (a) measuring the frequency of pulses generated by back electromotive force induced in the multiple phase windings due to a magnetic flux by a rotation of the rotor relative to the multiple phase windings;
   (b) comparing the frequency of pulses to a required minimum value; and
   (c) repeating program instruction steps (1)–(4) if the frequency of pulses is less than the required minimum value.

27. The controller of claim 22, wherein the logic circuit program instructions further include program instructions for:
   (a) measuring the frequency of pulses generated by back electromotive force induced in the multiple phase windings due to a magnetic flux by a rotation of the rotor relative to the multiple phase windings;
   (b) comparing the frequency of pulses to a required minimum value; and
   (c) performing program instruction step (4) if the frequency of pulses is less than the required minimum value after a number of repetitions of program instructions steps (1)–(3).

28. The controller of claim 22, wherein the program instruction step (2) of the logic circuit includes program instructions for selectively establishing the current paths through the selected windings capable of providing maximum forward torque to the rotor.

29. The controller of claim 22, wherein the program instruction step (4) of the logic circuit includes program instructions for applying the series of current pulses such that the positive current pulses have a pulse duration or an amplitude substantially the same as the pulse duration or amplitude, respectively, of the negative current pulses.

30. The controller of claim 22, wherein the program instruction step (1) of the logic circuit comprises program instructions for:
   (i) selectively establishing current paths through designated windings;
   (ii) applying voltage pulses of first and second opposite polarities to each said designated winding during the time period $T_D$;
   (iii) monitoring a current through the energized designated windings due to each of the voltage pulses of opposite polarities;
   (iv) determining the time difference between the rise time of the currents through the same designated winding; and
   (v) identifying a rotational position of the rotor relative to the designated windings based on the sign of the time difference.

31. A drive controller for driving a data recording disk drive comprising at least one data disk, a brushless DC motor having multiple phase windings arranged as a stator and a rotor having a permanent magnet or a DC current excitation winding for rotating the at least one data disk, a transducer for writing data to or reading data from the at least one data disk, a carrier supporting the transducer, and a voice coil motor for moving the carrier radially across the at least one data disk, the controller comprising:
   (a) a logic circuit electrically interconnected to the DC motor, the logic circuit being configured by program instructions for performing the steps of:
      (1) determining a rotational position of the rotor relative to the multiple phase windings during a time period $T_D$;
      (2) selectively establishing current paths through selected windings of the multiple phase windings capable of providing maximum torque to the rotor based on the rotational position of the rotor; and
      (3) applying a current to the selected windings for a time period $T_T$ to provide maximum torque to rotate the rotor;
   (b) a computer program including program instructions for applying a series of alternative positive and negative current pulses to the voice coil motor to oscillate the carrier radially in and out during at least a portion of the time period $T_T$;
   (c) a memory device containing the computer program; and
   (d) a processor electrically interconnected to the memory device, to the logic circuit and to the voice coil motor, for executing the program instructions of the computer program in synchrony with the operation of the logic circuit.

32. The controller of claim 31, wherein the computer program further includes program instructions for:
   (a) monitoring the rotation speed of the rotor; and
   (b) if the rotor speed is less than an operational speed of the rotor: (i) signaling the logic circuit to repeat steps (1)–(3), and (ii) applying the series of alternative positive and negative current pulses to the voice coil motor to oscillate the carrier radially in and out during at least the portion of the time period $T_T$.

33. The controller of claim 31, wherein the computer program further includes program instructions for:
   (a) measuring the frequency of pulses generated by back electromotive force induced in the multiple phase windings due to a magnetic flux by a rotation of the rotor relative to the multiple phase windings;
   (b) comparing the frequency of pulses to a required minimum value; and
   (c) if the frequency of pulses is less than the required minimum value: (i) signaling the logic circuit to repeat steps (1)–(3), and (ii) applying the series of alternative positive and negative current pulses to the voice coil motor to oscillate the carrier radially in and out during at least the portion of the time period $T_T$.

34. The controller of claim 31, wherein program instruction step (2) of the logic circuit includes program instructions for selectively establishing the current paths through the selected windings capable of providing maximum forward torque to the rotor.

35. The controller of claim 31, wherein the computer program includes program instructions for applying the series of current pulses such that the positive current pulses have a pulse duration or an amplitude substantially the same as the pulse duration or amplitude, respectively, of the negative current pulses.

36. The controller of claim 31, wherein program instruction step (1) of the logic circuit comprises program instructions for:
   (i) selectively establishing current paths through designated windings;
   (ii) applying voltage pulses of first and second opposite polarities to each said designated winding during the time period $T_D$;
   (iii) monitoring a current through the energized designated windings due to each of the voltage pulses of opposite polarities;
   (iv) determining the time difference between the rise time of the currents through the same designated winding; and
   (v) identifying a rotational position of the rotor relative to the designated windings based on the sign of the time difference.

37. A drive controller for driving a data recording disk drive comprising at least one data disk, a brushless DC motor having multiple phase windings arranged as a stator and a rotor having a permanent magnet or a DC current excitation winding for rotating the at least one data disk, a transducer for writing data to or reading data from the at least one data disk, a carrier supporting the transducer, and a voice coil motor for moving the carrier radially across the at least one data disk, the controller comprising:
   (a) a first logic circuit electrically interconnected to the DC motor, the first logic circuit being configured by program instructions to:
      (1) determine a rotational position of the rotor relative to the multiple phase windings during a time period $T_D$;
      (2) selectively establish current paths through selected windings of the multiple phase windings capable of providing maximum torque to the rotor based on the rotational position of the rotor; and
      (3) apply a current to the selected windings for a time period $T_T$ to provide maximum torque to rotate the rotor; and
   (b) a second logic circuit electrically interconnected to the voice coil motor, the second logic circuit being configured by program instructions to apply a series of alternative positive and negative current pulses to the voice coil motor to oscillate the carrier radially in and out during at least a portion of the time period $T_T$.

38. The controller of claim 37 further comprising a programmed processor electrically interconnected to the first logic circuit and to the second logic circuit to synchronize the operations of the first and the second logic circuits.

39. The controller of claim 37, wherein the first logic circuit program instructions further include program instructions for:
   (a) monitoring the rotation speed of the rotor; and
   (b) if the rotor speed is less than an operational speed of the rotor: (i) repeating steps (1)–(3), and (ii) signaling the second logic circuit to apply the series of alternative positive and negative current pulses to the voice coil motor to oscillate the carrier radially in and out during at least the portion of the time period $T_T$.

40. The controller of claim 37, wherein the first logic circuit program instructions further include program instructions for:
   (a) measuring the frequency of pulses generated by back electromotive force induced in the multiple phase windings due to a magnetic flux by a rotation of the rotor relative to the multiple phase windings;
   (b) comparing the frequency of pulses to a required minimum value; and
   (c) if the frequency of pulses is less than the required minimum value: (i) repeating steps (1)–(3), and (ii) signaling the second logic circuit to apply the series of alternative positive and negative current pulses to the voice coil motor to oscillate the carrier radially in and out during at least the portion of the time period $T_T$.

41. The controller of claim 37, wherein program instruction step (2) of the first logic circuit includes program instructions for selectively establishing the current paths through the selected windings capable of providing maximum forward torque to the rotor.

42. The controller of claim 37, wherein program instructions of the second logic circuit include program instructions for applying the series of current pulses such that the positive current pulses have a pulse duration or an amplitude substantially the same as the pulse duration or amplitude, respectively, of the negative current pulses.

43. The controller of claim 37, wherein program instruction step (1) of the first logic circuit comprises program instructions for:
   (i) selectively establishing current paths through designated windings;
   (ii) applying voltage pulses of first and second opposite polarities to each said designated winding during the time period $T_D$;
   (iii) monitoring a current through the energized designated windings due to each of the voltage pulses of opposite polarities;
   (iv) determining the time difference between the rise time of the currents through the same designated winding; and
   (v) identifying a rotational position of the rotor relative to the designated windings based on the sign of the time difference.

44. In a data recording disk drive comprising at least one data disk, a brushless DC motor having multiple phase windings arranged as a stator and a rotor having a permanent magnet or a DC current excitation winding for rotating the at least one data disk, a transducer for writing data to or reading data from the at least one data disk, a carrier supporting the transducer, and a voice coil motor for moving the carrier radially across the at least one data disk, a method of driving the disk drive comprising the steps of:
   (a) determining a rotational position of the rotor relative to the multiple phase windings during a time period $T_D$;
   (b) selectively establishing current paths through selected windings of the multiple phase windings capable of providing maximum torque to the rotor based on the rotational position of the rotor;
   (c) applying a current to the selected windings for a time period $T_T$ to provide torque to rotate the rotor; and
   (d) applying a series of alternative positive and negative current pulses to the voice coil motor to oscillate the carrier radially in and out during at least a portion of the time period $T_T$.

45. The method of claim 44, further comprising the steps of:
   (e) monitoring the rotation speed of the rotor; and
   (f) repeating steps (a)–(d) if the rotor speed is less than an operational speed of the rotor.

46. The method of claim 44, further comprising the steps of:

(e) measuring the frequency of pulses generated by back electromotive force induced in the multiple phase windings due to a magnetic flux by a rotation of the rotor relative to the multiple phase windings;

(f) comparing the frequency of pulses to a required minimum value corresponding to an operational speed of the rotor; and (g) repeating steps (a)–(d) if the frequency of pulses is less than the required minimum value.

47. The method of claim 46, further comprising the steps of commutating the DC motor if the operational speed of the rotor is substantially equal to or greater than the required minimum value by: (i) monitoring the back electromotive force induced in the multiple phase windings to identify windings capable of providing maximum forward torque to the rotor and (ii) applying a current to the identified windings to rotate the rotor.

48. The method of claim 44, wherein step (b) includes selectively establishing the current paths through the selected windings capable of providing maximum forward torque to the rotor.

49. The method of claim 44, wherein step (d) includes applying the series of current pulses such that the positive current pulses have a pulse duration or an amplitude substantially the same as the pulse duration or amplitude, respectively, of the negative current pulses.

50. The method of claim 44, wherein step (a) comprises:

(i) selectively establishing current paths through designated windings;

(ii) applying voltage pulses of first and second opposite polarities to each said designated winding during the time period $T_D$;

(iii) monitoring a current through the energized designated windings due to each of the voltage pulses of opposite polarities;

(iv) determining the time difference between the rise time of the currents through the same designated winding; and (v) identifying a rotational position of the rotor relative to the designated windings based on the sign of the time difference.

51. In a data recording disk drive comprising at least one data disk, a brushless DC motor having multiple phase windings arranged as a stator and a rotor having a permanent magnet or a DC current excitation winding for rotating the at least one data disk, a transducer for writing data to or reading data from the at least one data disk, a carrier supporting the transducer, and a voice coil motor for moving the carrier radially across the at least one data disk, a method of driving the disk drive comprising the steps of:

(a) determining a rotational position of the rotor relative to the multiple phase windings during a time period $T_D$;

(b) selectively establishing current paths through selected windings of the multiple phase windings capable of providing maximum torque to the rotor based on the rotational position of the rotor;

(c) applying a current to the selected windings for a time period $T_T$ to provide maximum torque to rotate the rotor;

(d) if the rotor speed is less than a desired operational speed of the rotor, repeating steps (a)–(d), wherein step (c) further includes applying a series of alternative positive and negative current pulses to the voice coil motor to oscillate the carrier radially in and out during at least a portion of the time period $T_T$.

52. The method of claim 51, wherein step (b) includes selectively establishing the current paths through the selected windings capable of providing maximum forward torque to the rotor.

53. The method of claim 51, wherein step (d) measures times between pulses generated by feeding a back electromotive force signal from the multiple phase windings into a threshold comparator to determine if the rotor speed is less than that speed required for reliably commutating the motor using a state machine with said back electromotive force pulses as inputs to the state machine.

54. The method of claim 53, wherein step (d) further includes the steps of: if the rotor speed is equal to or greater than a required minimum value, (i) identifying windings capable of providing maximum forward torque to the rotor based on the induced back electromotive force in the multiple phase windings, and (ii) applying a current to the identified windings to rotate the rotor.

55. The method of claim 51, wherein step (a) comprises:

(i) selectively establishing current paths through designated windings;

(ii) applying voltage pulses of first and second opposite polarities to each said designated winding during the time period $T_D$;

(iii) monitoring a current through the energized designated windings due to each of the voltage pulses of opposite polarities;

(iv) determining the time difference between the rise time of the currents through the same designated winding; and (v) identifying a rotational position of the rotor relative to the designated windings based on the sign of the time difference.

56. A software system for driving a data recording disk drive comprising at least one data disk, a brushless DC motor having multiple phase windings arranged as a stator and a rotor having a permanent magnet or a DC current excitation winding for rotating the at least one data disk, a transducer for writing data to or reading data from the at least one data disk, a carrier supporting the transducer, a voice coil motor for moving the carrier radially across the at least one data disk, a logic circuit electrically interconnected to the DC motor and to the voice coil motor, the logic circuit being configured by the software system, the software system comprising program instructions for:

(a) determining a rotational position of the rotor relative to the multiple phase windings during a time period $T_D$;

(b) selectively establishing current paths through selected windings of the multiple phase windings capable of providing maximum torque to the rotor based on the rotational position of the rotor;

(c) applying a current to the selected windings for a time period $T_T$ to provide maximum torque to rotate the rotor; and (d) applying a series of alternative positive and negative current pulses to the voice coil motor to oscillate the carrier radially in and out during at least a portion of the time period $T_T$.

57. The software system of claim 56, further comprising program instructions for:

(e) monitoring the rotation speed of the rotor; and (f) repeating program instruction steps (a)–(d) if the rotor speed is less than an operational speed of the rotor.

58. The software system of claim 56, further comprising program instructions for:

(e) measuring times between pulses generated by feeding a back electromotive force signal from the multiple phase windings into a threshold comparator to determine if the rotor speed is less than a minimum required value; and (f) repeating program instruction steps (a)–(d) if the rotor speed is less than the threshold value.

59. The software system of claim 56, wherein program instruction step (b) includes program instructions for selectively establishing the current paths through the selected windings capable of providing maximum forward torque to the rotor.

60. The software system of claim 56, wherein program instruction step (d) includes program instructions for applying the series of current pulses such that the positive current pulses have a pulse duration or an amplitude substantially the same as the pulse duration or amplitude, respectively, of the negative current pulses.

61. The software system of claim 56, wherein program instruction step (a) comprises program instructions for:
  (i) selectively establishing current paths through designated windings;
  (ii) applying voltage pulses of first and second opposite polarities to each said designated winding during the time period $T_D$;
  (iii) monitoring a current through the energized designated windings due to each of the voltage pulses of opposite polarities;
  (iv) determining the time difference between the rise time of the currents through the same designated winding; and
  (v) identifying a rotational position of the rotor relative to the designated windings based on the sign of the time difference.

* * * * *